(12) United States Patent
Wei et al.

(10) Patent No.: US 11,797,870 B2
(45) Date of Patent: Oct. 24, 2023

(54) OPTIMIZED SCORE TRANSFORMATION FOR FAIR CLASSIFICATION

(71) Applicants: International Business Machines Corporation, Armonk, NY (US); President and Fellows of Harvard College, Cambridge, MA (US)

(72) Inventors: Dennis Wei, Sunnyvale, CA (US); Karthikeyan Natesan Ramamurthy, Pleasantville, NY (US); Flavio du Pin Calmon, Cambridge, MA (US)

(73) Assignees: International Business Machines Corporation, Armonk, NY (US); President and Fellows of Harvard College, Cambridge, MA (US)

( * ) Notice: Subject to any disclaimer, the term of this patent is extended or adjusted under 35 U.S.C. 154(b) by 593 days.

(21) Appl. No.: 16/888,413

(22) Filed: May 29, 2020

(65) Prior Publication Data
US 2021/0374581 A1 Dec. 2, 2021

(51) Int. Cl.
*G06N 7/01* (2023.01)
*G06N 20/00* (2019.01)
*G06N 5/022* (2023.01)
*G06N 5/045* (2023.01)

(52) U.S. Cl.
CPC ............. *G06N 7/01* (2023.01); *G06N 5/022* (2013.01); *G06N 5/045* (2013.01); *G06N 20/00* (2019.01)

(58) Field of Classification Search
CPC ........ G06N 20/00; G06N 20/10; G06N 20/20; G06N 5/00; G06N 5/02; G06N 5/022; G06N 5/04; G06N 5/045; G06N 7/005; G06N 7/00
See application file for complete search history.

(56) References Cited

U.S. PATENT DOCUMENTS

| | | | |
|---|---|---|---|
| 8,099,696 B2 | 1/2012 | Lehavot et al. | |
| 9,471,390 B2 | 10/2016 | He et al. | |
| 2010/0014762 A1* | 1/2010 | Renders | G06K 9/6277 |
| | | | 382/224 |

OTHER PUBLICATIONS

Lahoti et al. "iFair: Learning Individually Fair Data Representations for Algorithmic Decision Making", 2019 https://ieeexplore.ieee.org/stamp/stamp.jsp?tp=&arnumber=8731591&tag=1 (Year: 2019).*

(Continued)

*Primary Examiner* — Kamran Afshar
*Assistant Examiner* — Shoun J Abraham
(74) *Attorney, Agent, or Firm* — Caleb Wilkes; Otterstedt & Kammer PLLC

(57) ABSTRACT

Obtain, from an existing machine learning classifier, original probabilistic scores classifying samples taken from two or more groups into two or more classes via supervised machine learning. Associate the original probabilistic scores with a plurality of original Lagrange multipliers. Adjust values of the plurality of original Lagrange multipliers via low-dimensional convex optimization to obtain updated Lagrange multipliers that satisfy fairness constraints as compared to the original Lagrange multipliers. Based on the updated Lagrange multipliers, closed-form transform the original probabilistic scores into transformed probabilistic scores that satisfy the fairness constraints while minimizing loss in utility. The fairness constraints are with respect to the two or more groups.

18 Claims, 11 Drawing Sheets

(56) References Cited

OTHER PUBLICATIONS

Rezaei et al. "Fair Logistic Regression: An Adversarial Perspective", Mar. 2019 https://arxiv.org/pdf/1903.03910v2.pdf (Year: 2019).*
Morina et al. "Auditing and Achieving Intersectional Fairness in Classification Problems" Nov. 2019 https://arxiv.org/pdf/1911.01468v1.pdf (Year: 2019).*
Coston et al. "Fair Transfer Learning with Missing Protected Attributes" Jan. 2019 https://dl.acm.org/doi/pdf/10.1145/3306618.3314236 (Year: 2019).*
Celis et al. "Classification with Fairness Constraints: A Meta-Algorithm with Provable Guarantees" Jan. 2019 https://dl.acm.org/doi/pdf/10.1145/3287560.3287586 (Year: 2019).*
De Hoog et al. "A Market Mechanism for Electric Vehicle Charging Under Network Constraints" Mar. 2016 https://ieeexplore.ieee.org/stamp/stamp.jsp?tp=&arnumber=7328327&tag=1 (Year: 2016).*
Kamiran et al. "Data preprocessing techniques for classification without discrimination", Dec. 2011 https://link.springer.com/content/pdf/10.1007/s10115-011-0463-8.pdf (Year: 2011).*
Agarwal et al. "A Reductions Approach to Fair Classification", 2018 http://proceedings.mlr.press/v80/agarwal18a/agarwal18a.pdf (Year: 2018).*
Kamishima et al. "Fairness-Aware Classifier with Prejudice Remover Regularizer", 2012 https://link.springer.com/content/pdf/10.1007/978-3-642-33486-3_3.pdf (Year: 2012).*
Zafar et al. "Fairness Constraints: Mechanisms for Fair Classification", 2017 http://proceedings.mlr.press/v54/zafar17a/zafar17a.pdf (Year: 2017).*
Krasanakis et al. "Adaptive Sensitive Reweighting to Mitigate Bias in Fairness-aware Classification", Apr. 2018 https://dl.acm.org/doi/pdf/10.1145/3178876.3186133 (Year: 2018).*
Celis et al. "Classification with Fairness Constraints: A Meta-Algorithm with Provable Guarantees", 2019 https://dl.acm.org/doi/pdf/10.1145/3287560.3287586 (Year: 2019).*
Rezaei et al.,. Fairness for Robust Log Loss Classification., arXiv preprint arXiv:1903.03910 (2019), 19 pages.
Shrestha et al., Fairness in Algorithmic Decision-Making: Applications in Multi-Winner Voting, Machine Learning, and Recommender Systems, Algorithms 12, No. 9 (2019), 199, 28 pages.
Zafar et al., Fairness Constraints: A Flexible Approach for Fair Classification, Journal of Machine Learning Research 20, No. 75 (2019), pp. 1-42.
Noroozi et al., Leveraging Semi-Supervised Learning for Fairness using Neural Networks, arXiv preprint arXiv:1912.13230 (2019), 6 pages.
Celis et al., Classification with fairness constraints: A meta-algorithm with provable guarantees, In Proceedings of the Conference on Fairness, Accountability, and Transparency, pp. 319-328, 2019.
Yang et al., Deep Learning under Fairness Constraints, 32nd Conference on Neural Information Processing Systems (NeurIPS 2018), 7 pages Retrieved from https://guanqun-yang.github.io/paper/deep_fair.pdf.
Kamishima et al., Model-based and actual independence for fairness-aware classification, Data mining and knowledge discovery 32, No. 1 (2018), pp. 258-286.
Wei et al., Optimized Score Transformation for Fair Classification, arXiv preprint arXiv:1906.00066, 2019, Dec 6 [v2], 33 pages (Grace Period Disclosure).
Wei et al., Optimized Score Transformation for Fair Classification, arXiv preprint arXiv:1906.00066, May 31, 2019 [v1], 24 pages, (Grace Period Disclosure).
Pedreschi et al., A study of top-k measures for discrimination discovery, In Proceedings of the 27th Annual ACM Symposium on Applied Computing, pp. 126-131, 2012.
Dwork et al., Fairness through awareness, In Proceedings of the 3rd innovations in theoretical computer science conference, pp. 214-226, 2012.
Kamiran et al., Quantifying explainable discrimination and removing illegal discrimination in automated decision making, Knowledge and information systems 35, No. 3, 2013, pp. 613-644 https://doi.org/10.1007/s10115-012-0584-8.
Hardt et al., Equality of opportunity in supervised learning, In Advances in neural information processing systems (NeurIPS), pp. 3323-3331, 2016 http://dl.acm.org/citation.cfm?id=3157382.3157469.
Zafar et al., Fairness beyond disparate treatment & disparate impact: Learning classification without disparate mistreatment, In Proceedings of the 26th international conference on world wide web, pp. 1171-1180, 2017.
Chouldechova, Fair prediction with disparate impact: A study of bias in recidivism prediction instruments, Big data vol. 6, No. 2, 2017, pp. 153-163.
Kleinberg et al., Inherent trade-offs in the fair determination of risk scores, arXiv preprint arXiv:1609.05807, 2016, 23 pages.
Kilbertus et al., Avoiding discrimination through causal reasoning, Advances in Neural Information Processing Systems (NeurIPS), Dec. 2017, pp. 656-666 http://dl.acm.org/citation.cfm?id=3294771.3294834.
Kusner et al., Counterfactual fairness, Advances in Neural Information Processing Systems (NeurIPS), Dec. 2017, pp. 4066-4076 http://papers.nips.cc/paper/6995-counterfactual-fairness. pdf.
Zafar, et al., From parity to preference-based notions of fairness in classification, Advances in Neural Information Processing Systems (NeurIPS), Dec. 2017, pp. 229-239 http://papers.nips.cc/paper/6627-from-parity-to-preference-based-notions-of-fairness-in-classification.pdf.
Nabi et al., Fair inference on outcomes, AAA/Conference on Artificial Intelligence (AAAI-18), Feb. 2018, pp. 1931-1940 https://www.aaai.org/ocs/index.php/AAAI/AAAI18/paper/view/16683/15898.
Kearns et al., Preventing fairness gerrymandering: Auditing and learning for subgroup fairness, International Conference on Machine Learning, Dec. 2018, pp. 2569-2577.
Heidari et al., Fairness behind a veil of ignorance: A welfare analysis for automated decision making, Advances in Neural Information Processing Systems (NeurIPS), Dec. 2018, pp. 1265-1276.
Chiappa, Path-specific counterfactual fairness, AAAI Conference on Artificial Intelligence (AAAI) Jan. 2019, vol. 33, pp. 7801-7808.
Friedler et al., A comparative study of fairness-enhancing interventions in machine learning, Proceedings of the Conference on Fairness, Accountability, and Transparency, ACM Jan. 2019, pp. 329-338.
Kamiran et al., Data preprocessing techniques for classification without discrimination, Knowledge and Information Systems, vol. 33, No. 1, pp. 1-33, Oct. 2012.
Hajian et al., A methodology for direct and indirect discrimination prevention in data mining, IEEE Transactions on Knowledge and Data Engineering, vol. 25, No. 7, pp. 1445-1459, Jul. 2013.
Zemel et al., Learning fair representations, Proceedings of the 30th International Conference on Machine Learning (ICML), Jun. 2013, pp. 325-333 http://proceedings.mlr. press/v28/zemel13.html.
Feldman et al., Certifying and removing disparate impact, Proceedings of the 21st ACM SIGKDD International Conference on Knowledge Discovery and Data Mining (KDD), Aug. 2015, pp. 259-268 http://doi.acm.org/I O. II 45/2783258.2783311.
Calmon et al., Optimized pre-processing for discrimination prevention, Advances in Neural Information Processing Systems (NeurIPS), Dec. 2017, pp. 3992-4001 http://papers.nips.cc/paper/6988-optimized-pre-processing-for-discrimination-prevention. pdf.
Kamiran et al., Decision theory for discrimination-aware classification, IEEE 12th International Conference on Data Mining (ICDM), Dec. 2012, pp. 924-929.
Fish et al., A confidence-based approach for balancing fairness and accuracy, Proceedings of the 2016 SIAM International Conference on Data Mining (SDM), May 2016, pp. 144-152.
Pleiss et al., On fairness and calibration, Advances in Neural Information Processing Systems (NeurIPS), Dec. 2017, pp. 5680-5689 http://papers.nips.cc/paper/715 I -on-fairness-and-calibration.pdf.

(56) References Cited

OTHER PUBLICATIONS

Woodworth et al., Learning non-discriminatory predictors, Proceedings of the 2017 Conference on Learning Theory (COLT), Jul. 2017, pp. 1920-1953 http://proceedings.mlr. press/v65/woodworth17a.html.

Calders et al., Three naive Bayes approaches for discrimination-free classification, Data Mining and Knowledge Discovery, vol. 21, No. 2, pp. 277-292, Sep. 2010 https://doi.org/10.1007/s10618-010-0190-x.

Kamishima et al., Fairness-aware classifier with prejudice remover regularizer, Joint European Conference on Machine Learning and Knowledge Discovery in Databases (ECML PKDD), Sep. 2012, pp. 35-50.

Zafar et al., Fairness Constraints: Mechanisms for Fair Classification, Proceedings of the 20th International Conference on Artificial Intelligence and Statistics (A/STATS), Apr. 2017, pp. 962-970 http://proceedings.mlr.press/v54/zafar17a.html.

Dwork et al., Decoupled classifiers for group-fair and efficient machine learning, Proceedings of the 1st Conference on Fairness, Accountability and Transparency (FAT*), Feb. 2018, pp. 119-133.

Agarwal et al., A reductions approach to fair classification, Proceedings of the 35th International Conference on Machine Learning (ICML), Jul. 2018, pp. 60-69 http://proceedings.mlr.press/v80/agarwal I 8a.html.

Krasanakis et al., Adaptive sensitive reweighting to mitigate bias in fairness-aware classification, Proceedings of the 2018 World Wide Web Conference (WWW), Apr. 2018, pp. 853-862.

Donini et al., Empirical risk minimization under fairness constraints, Advances in Neural Information Processing Systems ( NeurIPS ), Dec. 2018, pp. 2791-2801 http://papers.nips.cc/paper/7544-empirical-risk-minimization-under-fairness-constraints. pdf.

Celis et al., Classification with fairness constraints: A meta-algorithm with provable guarantees, Proceedings of the Conference on Fairness, Accountability, and Transparency (FAT*), Jan. 2019, pp. 319-328 https://dl.acm.org/doi/pdf/10.1145/3287560.3287586.

Madras et al., Learning adversarially fair and transferable representations, in Proceedings of the 35th International Conference on Machine Learning (ICML), Jul. 2018, pp. 3384-3393 http://proceedings.mlr.press/v80/madras18a.html.

Salimi et al., Capuchin: Causal database repair for algorithmic fairness, Feb. 2019, arXiv e-print https://arxiv.org/abs/1902.08283 29 pages.

Louizos et al. The variational fair encoder, in Proceedings of the International Conference on Learning Representations (ICLR), May 2016, pp. 1-11.

Edwards et al., Censoring representations with an adversary, Proceedings of the International Conference on Learning Representations (ICLR), May 2016, pp. 1-14.

Xie et al., Controllable invariance through adversarial feature learning, in Advances in Neural Information Processing Systems (NeurIPS), Dec. 2017, pp. 585-596 http://papers.nips.cc/paper/6661-controllable-invariance-through-adversarial-feature-learning.pdf.

Xu et al., FairGAN: Fairness-aware generative adversarial networks, IEEE International Conference on Big Data (Big Data), Dec. 2018, pp. 570-575.

Beutel et al., Data decisions and theoretical implications when adversarially learning fair representations, in Workshop on Fairness, Accountability, and Transparency in Machine Learning (FATML), Aug. 2017, pp. 1-5.

Zhang et al., Mitigating unwanted biases with adversarial learning, Proceedings of the AAAI/ACM Conference on Artificial Intelligence, Ethics, and Society (AIES), Feb. 2018, pp. 335-340.

Menon et al., The cost of fairness in binary classification, in Proceedings of the 1st Conference on Fairness, Accountability and Transparency (FAT*), Feb. 2018, pp. 107-118.

Corbett-Davies et al. Algorithmic decision making and the cost of fairness, in Proceedings of the 23rd ACM SIGKDD International Conference on Knowledge Discovery and Data Mining (KDD), Aug. 2017, pp. 797-806.

Jiang et al, Identifying and correcting label bias in machine learning, Jan. 2019, arXiv e-print https://arxiv.org/abs/1901.04966 16 pages.

Coston et al., Fair transfer learning with missing protected attributes, in Proceedings of the AAAI/ACM Conference on Artificial Intelligence, Ethics, and Society (A/ES), Jan. 2019, pp. 1-8.

S. Boyd et al., Convex Optimization. Cambridge, UK: Cambridge University Press, 2004, 216 pages.

Hernandez-Orallo et al., A unified view of performance metrics: Translating threshold choice into expected classification loss, J. Mach. Learn. Res., vol. 13, pp. 2813-2869, Oct. 2012.

Boyd et al., Distributed optimization and statistical learning via the alternating direction method of multipliers, Foundations and Trends© in Machine learning, vol. 3, No. 1, pp. 1-122, 2011.

Bellamy et al., AI Fairness 360: An extensible toolkit for detecting, understanding, and mitigating unwanted algorithmic bias, Oct. 2018, https://arxiv.org/abs/1810.01943, 20 pages.

Pedregosa et al., Scikit-learn: Machine learning in Python, Journal of Machine Learning Research, vol. 12, pp. 2825-2830, Oct. 2011.

Platt et al., Probabilistic outputs for support vector machines and comparisons to regularized likelihood methods, in Advances in Large Margin Classifiers, Mar. 1999, pp. 61-74.

Linear programming—Wikipedia, https://en.wikipedia.org/wiki/Linear_programming, 19 pages, Feb. 27, 2023.

Bertsekas, Nonlinear Programming, 2nd ed. Belmont, MA, USA: Athena Scientific, 1999, 94 double pages.

R. I. Jennrich, Asymptotic Properties of non-linear least squares estimators, Annals of Mathematical Statistics, v. 40 n. 2, p. 633-643, 1969.

Peter Mell and Timothy Grance, The NIST Definition of Cloud Computing, NIST Special Publication 800-145, Sep. 2011, cover, i-iii, 1-3.

* cited by examiner

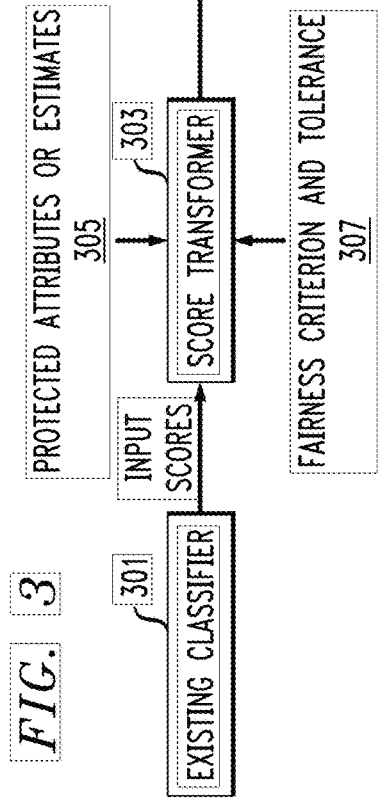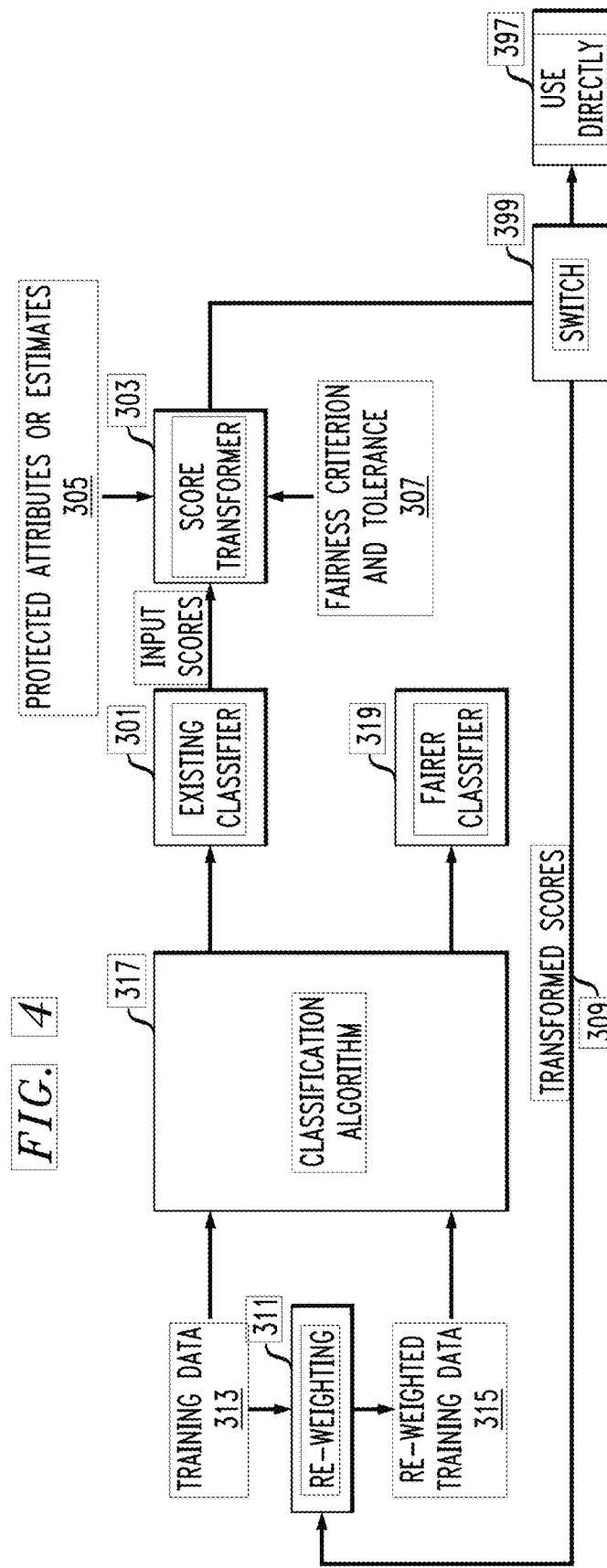

FIG. 5

| METHOD | PRE | IN | POST | SP | EO | NO A AT TEST TIME | SCORES | APPROX FAIRNESS | ANY CLASSIFIER |
|---|---|---|---|---|---|---|---|---|---|
| MASSAGE, REWEIGH | ✓ | | | ✓ | | | | | ✓ |
| OPP | ✓ | | | ✓ | | | | | ✓ |
| HPS | | | | | | | ✓ | ✓ | ✓ |
| REJECT | | | ✓ | | ✓* | | | | ✓ |
| WPP | | | ✓ | ✓ | | | ✓ | | ✓ |
| FC | | ✓ | ✓ | ✓ | | | ✓ | | |
| DM | | ✓ | | | | | ✓ | ✓ | |
| FERM | | ✓ | | | ✓ | ✓ | | ✓ | |
| REDUCTIONS | | ✓ | | ✓ | ✓ | ✓ | ✓ | ✓ | ✓ |
| PROPOSED FST | ✓ | | | ✓ | | ✓ | ✓ | ✓ | ✓ |

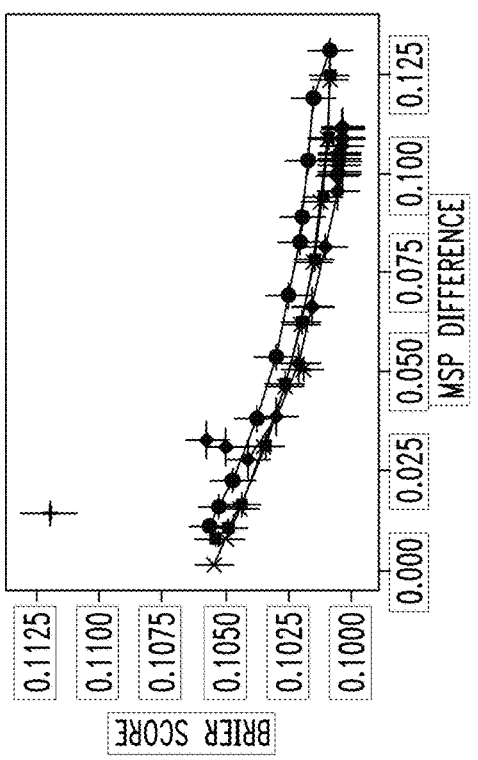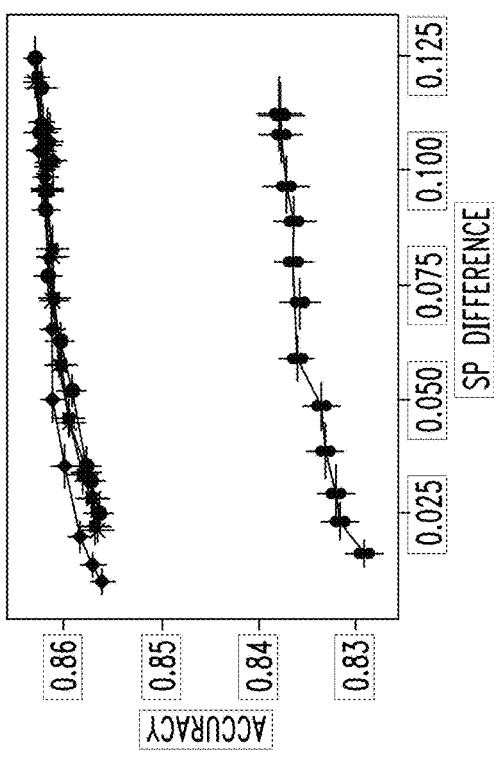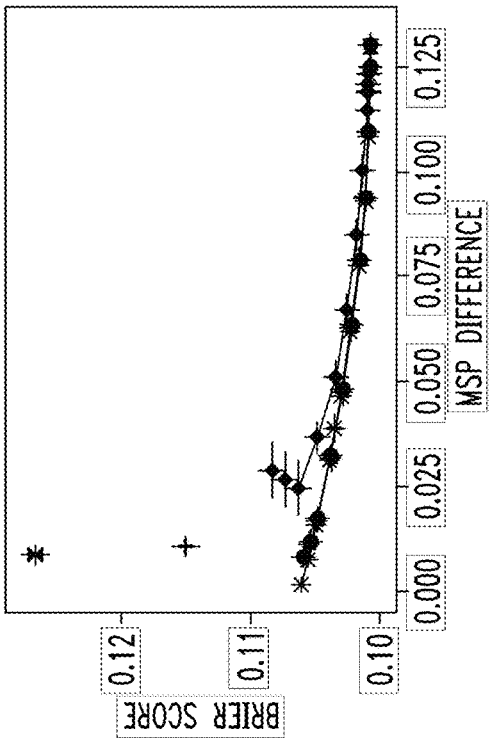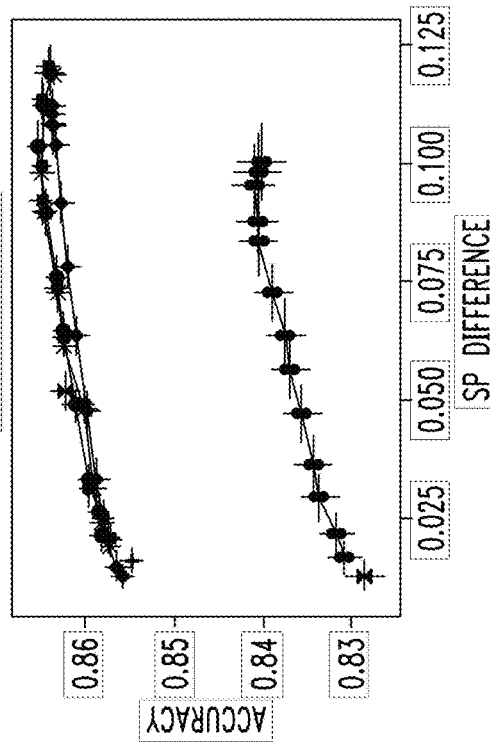
FIG. 8

OPTIMIZED SCORE TRANSFORMATION FOR FAIR CLASSIFICATION

STATEMENT REGARDING PRIOR DISCLOSURES BY THE INVENTOR OR A JOINT INVENTOR

The following disclosure(s) are submitted under 35 U.S.C. 102(b)(1)(A):

Dennis Wei, Karthikeyan Natesan Ramamurthy, Flavio du Pin Calmon, Optimized Score Transformation for Fair Classification, arXiv preprint arXiv:1906.00066. 2019 May 31 [v1].

Dennis Wei, Karthikeyan Natesan Ramamurthy, Flavio du Pin Calmon, Optimized Score Transformation for Fair Classification, arXiv preprint arXiv:1906.00066. 2019 Dec. 6 [v2].

BACKGROUND

The present invention relates to the electrical, electronic and computer arts, and more specifically, to machine learning and the like.

SUMMARY

Principles of the invention provide techniques for optimized score transformation for fair classification. In one aspect, an exemplary method includes obtaining, from an existing machine learning classifier, original probabilistic scores classifying samples taken from two or more groups into two or more classes via supervised machine learning; associating the original probabilistic scores with a plurality of original Lagrange multipliers; adjusting values of the plurality of original Lagrange multipliers via low-dimensional convex optimization to obtain updated Lagrange multipliers that satisfy fairness constraints as compared to the original Lagrange multipliers; and based on the updated Lagrange multipliers, closed-form transforming the original probabilistic scores into transformed probabilistic scores that satisfy the fairness constraints while minimizing loss in utility. The fairness constraints are with respect to the two or more groups.

In another aspect, an exemplary system includes a memory; a non-transitory computer readable medium including computer executable instructions; and at least one processor, coupled to the memory and the non-transitory computer readable medium, and operative to execute the instructions to be operative to obtain, from an existing machine learning classifier, original probabilistic scores classifying samples taken from two or more groups into two or more classes via supervised machine learning; associate the original probabilistic scores with a plurality of original Lagrange multipliers; adjust values of the plurality of original Lagrange multipliers via low-dimensional convex optimization to obtain updated Lagrange multipliers that satisfy fairness constraints as compared to the original Lagrange multipliers; and, based on the updated Lagrange multipliers, closed-form transform the original probabilistic scores into transformed probabilistic scores that satisfy the fairness constraints while minimizing loss in utility. The fairness constraints are with respect to the two or more groups.

As used herein, "facilitating" an action includes performing the action, making the action easier, helping to carry the action out, or causing the action to be performed. Thus, by way of example and not limitation, instructions executing on one processor might facilitate an action carried out by instructions executing on a remote processor, by sending appropriate data or commands to cause or aid the action to be performed. For the avoidance of doubt, where an actor facilitates an action by other than performing the action, the action is nevertheless performed by some entity or combination of entities.

One or more embodiments of the invention or elements thereof can be implemented in the form of a computer program product including a computer readable storage medium with computer usable program code for performing the method steps indicated. Furthermore, one or more embodiments of the invention or elements thereof can be implemented in the form of a system (or apparatus) including a memory, and at least one processor that is coupled to the memory and operative to perform exemplary method steps. Yet further, in another aspect, one or more embodiments of the invention or elements thereof can be implemented in the form of means for carrying out one or more of the method steps described herein; the means can include (i) hardware module(s), (ii) software module(s) stored in a computer readable storage medium (or multiple such media) and implemented on a hardware processor, or (iii) a combination of (i) and (ii); any of (i)-(iii) implement the specific techniques set forth herein.

Techniques of the present invention can provide substantial beneficial technical effects. For example, one or more embodiments provide:

predicted scores (as opposed to binary classifications);
usability with a wide variety of fairness measures;
ability to function without protected attributes at test time;
improved performance of the computer that is transforming scores to make them fairer, as compared to prior art techniques, due to use of a closed-form expression for optimal transformed scores and/or low-dimensional convex optimization for transformation parameters, thereby reducing CPU time and/or obtaining better results for same (or less) amount of CPU time;
ability to switch between pre- and post-processing modes.

These and other features and advantages of the present invention will become apparent from the following detailed description of illustrative embodiments thereof, which is to be read in connection with the accompanying drawings.

BRIEF DESCRIPTION OF THE DRAWINGS

FIG. 3 shows use of aspects of the invention in a post-processing mode;

FIG. 4 shows use of aspects of the invention in a pre-processing mode;

FIG. 5 is a table comparing aspects of the present invention to prior art techniques;

DETAILED DESCRIPTION

Figure 1:
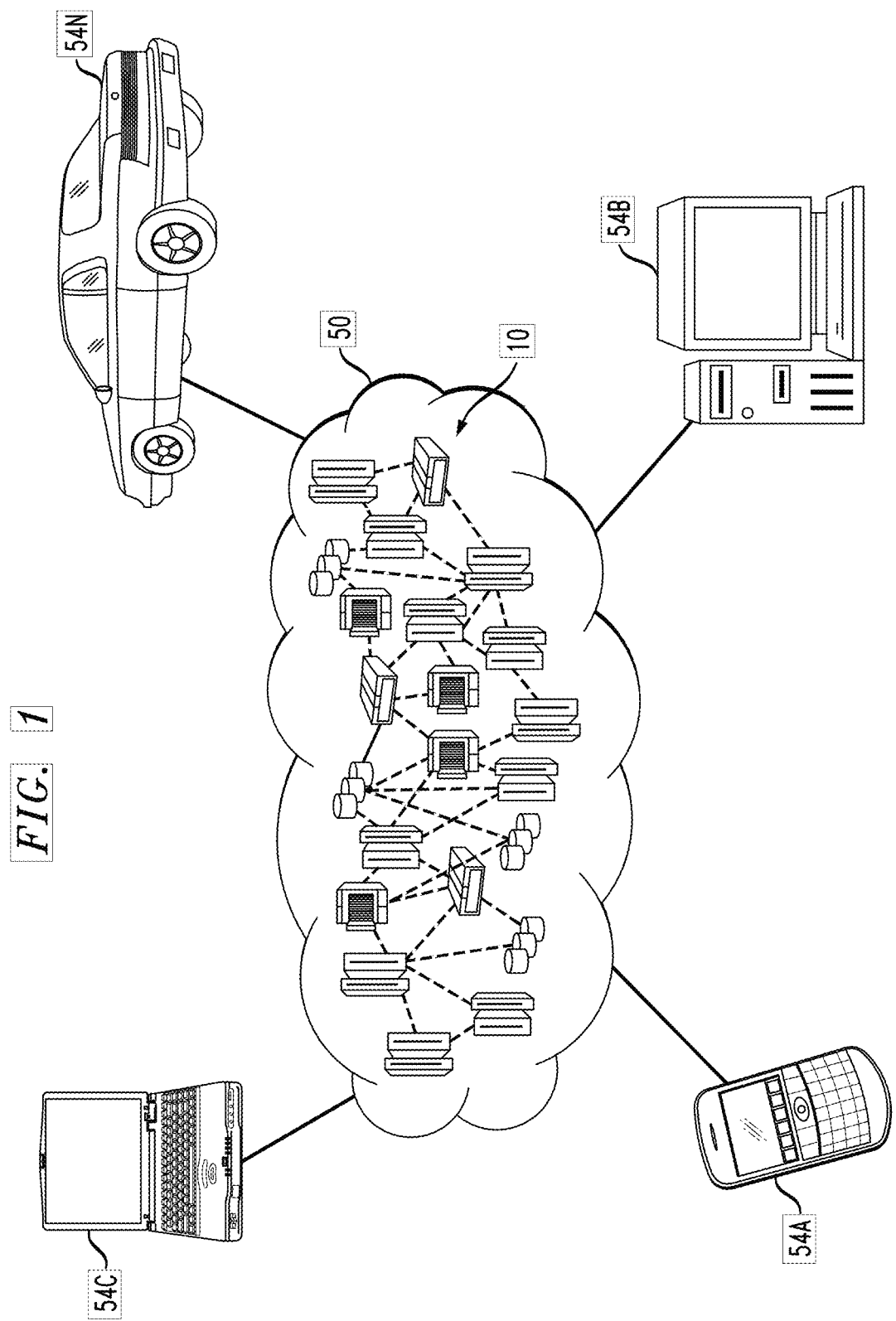
FIG. 1 depicts a cloud computing environment according to an embodiment of the present invention.

It is understood in advance that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g. networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based email). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load balancing between clouds).

A cloud computing environment is service oriented with a focus on statelessness, low coupling, modularity, and semantic interoperability. At the heart of cloud computing is an infrastructure comprising a network of interconnected nodes.

Referring now to FIG. 1, illustrative cloud computing environment 50 is depicted. As shown, cloud computing environment 50 includes one or more cloud computing nodes 10 with which local computing devices used by cloud consumers, such as, for example, personal digital assistant (PDA) or cellular telephone 54A, desktop computer 54B, laptop computer 54C, and/or automobile computer system 54N may communicate. Nodes 10 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-N shown in FIG. 1 are intended to be illustrative only and that computing nodes 10 and cloud computing environment 50 can communicate with any type of computerized device over any type of network and/or network addressable connection (e.g., using a web browser).

Figure 2:
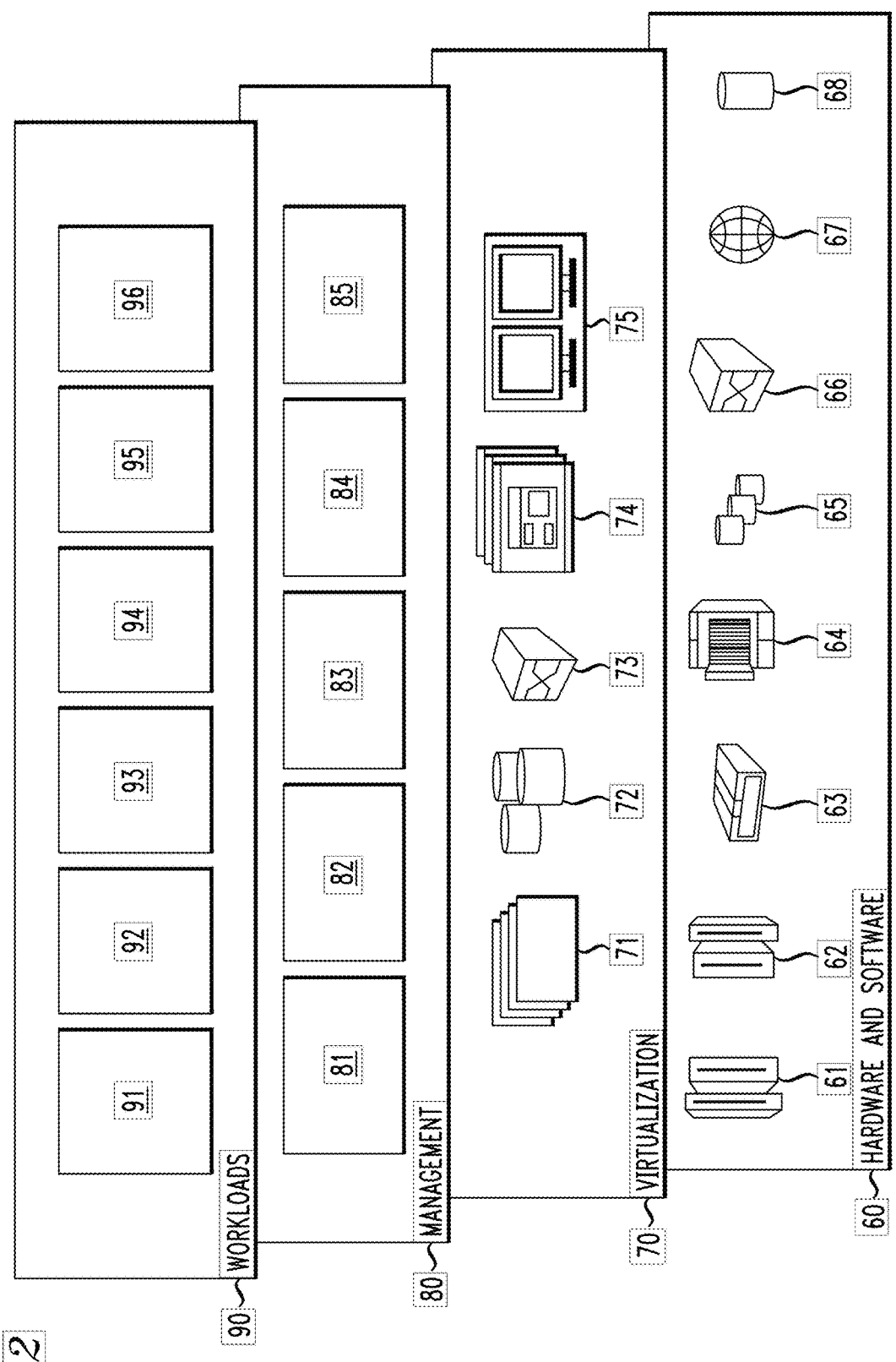
FIG. 2 depicts abstraction model layers according to an embodiment of the present invention.

Referring now to FIG. 2, a set of functional abstraction layers provided by cloud computing environment 50 (FIG. 1) is shown. It should be understood in advance that the components, layers, and functions shown in FIG. 2 are intended to be illustrative only and embodiments of the invention are not limited thereto. As depicted, the following layers and corresponding functions are provided:

Hardware and software layer 60 includes hardware and software components. Examples of hardware components include: mainframes 61; RISC (Reduced Instruction Set Computer) architecture based servers 62; servers 63; blade servers 64; storage devices 65; and networks and networking components 66. In some embodiments, software components include network application server software 67 and database software 68.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75.

In one example, management layer 80 may provide the functions described below. Resource provisioning 81 provides dynamic procurement of computing resources and other resources that are utilized to perform tasks within the cloud computing environment. Metering and Pricing 82 provide cost tracking as resources are utilized within the cloud computing environment, and billing or invoicing for consumption of these resources. In one example, these resources may include application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provide pre-arrangement for, and procurement of, cloud computing resources for which a future requirement is anticipated in accordance with an SLA.

Workloads layer 90 provides examples of functionality for which the cloud computing environment may be utilized. Examples of workloads and functions which may be provided from this layer include: mapping and navigation 91; software development and lifecycle management 92; virtual classroom education delivery 93; data analytics processing 94; transaction processing 95; and a cloud-based service 96 (or one or more elements thereof) to provide optimized score transformation for fair classification.

Aspects of the invention provide optimized score transformation for fair classification and the like. One or more embodiments address fair probabilistic classification wherein the outputs of primary interest are predicted probabilities, commonly referred to as scores. One or more embodiments formulate the problem of transforming scores to satisfy fairness constraints that are linear in conditional means of scores while minimizing the loss in utility. The formulation can be applied either to post-process classifier outputs or to pre-process training data, thus allowing significant freedom in selecting a classification algorithm. A closed-form expression is provided for the optimal transformed scores and a convex optimization problem for the transformation parameters. In the population limit, the transformed score function is the fairness-constrained minimizer of cross-entropy with respect to the optimal unconstrained scores. In the finite sample setting, one way to approach the solution uses a combination of standard probabilistic classifiers and alternating direction method of multipliers (ADMM). The transformation parameters obtained from the finite-sample procedure are asymptotically optimal. Comprehensive experiments comparing to ten existing methods show that the inventive "FairScoreTransformer' has advantages for score-based metrics such as Brier score and Area Under the Receiver Operating Characteristic (AUC), while remaining competitive for binary label-based metrics such as accuracy.

Recent years have seen a surge of interest in the problem of fair classification, which is concerned with disparities in classification output or performance when conditioned on a protected attribute such as race or gender, or ethnicity. Many measures of fairness have been introduced and fairness-enhancing interventions have been proposed to mitigate these disparities. Roughly categorized, these interventions either (i) change data used to train a classifier (pre-processing), (ii) change a classifier's output (post-processing) or (iii) directly change a classification model to ensure fairness (in-processing).

One or more embodiments advantageously address probabilistic classification, in which the outputs of interest are predicted probabilities of belonging to one of the classes as opposed, to binary predictions. The predicted probabilities are often referred to as scores and are desirable because they indicate confidences in predictions. One or more embodiments provide an optimization formulation for transforming scores to satisfy fairness constraints while minimizing the loss in utility. The formulation accommodates any fairness criteria that can be expressed as linear inequalities involving conditional means of scores, including variants of statistical parity (SP) and equalized odds (EO).

In addition to a novel problem formulation, one or more embodiments provide a closed-form expression for the optimal transformed scores and a convex dual optimization problem for the Lagrange multipliers that parametrize the transformation. In the population limit, the transformed scores minimize cross-entropy with respect to the conditional distribution $p_{Y|X}$ of the outcome Y given features X; in other words the unconstrained optimal score, subject to the fairness constraints. In the finite sample setting, one or more embodiments provide a method referred to herein as FairScoreTransformer (FST) that uses standard probabilistic classifiers (e.g. logistic regression) to approximate $p_{Y|X}$ and the alternating direction method of multipliers (ADMM) to solve the dual problem. The closed-form expression for the transformed scores and the low dimension of the dual problem (a small multiple of the number of protected groups) make FST computationally lightweight. Furthermore, in one or more embodiments, the Lagrange multiplier parameters obtained by FST are asymptotically optimal.

FST lends itself naturally to post-processing and can also be applied in pre-processing. As such, FST can be particularly beneficial in situations that make post- and pre-processing attractive; e.g., a) when it is not possible or desirable to modify an existing classifier (only post-processing is possible); b) when freedom is desired to select the most suitable classifier for an application, whether it maximizes performance or has some other desired property such as interpretability (post- and pre-processing apply); and/or c) when standard training algorithms are used without the additional complexity of accounting for fairness (post- and pre-processing again). In-processing meta-algorithms can also support situation b) but not a) or c). Pre-processing is further advantageous in addressing the problem at its source, namely historical bias and imbalance in the data, and also allows corrected data to be published as an output in its own right for use by others. Compared to existing post- and pre-processing methods, FST is considerably more flexible in handling more cases (see summary in the table of FIG. 5).

Experimental results are presented elsewhere herein, comparing FST to existing methods. On score-based metrics such as Brier score and AUC, FST achieves better fairness-utility trade-offs and hence is indeed advantageous when scores are of interest. At the same time, it remains competitive on binary label-based metrics such as accuracy.

In summary, one or more embodiments enable fairness-ensuring post- and pre-processing that is theoretically grounded and optimal in the population limit; is computationally lightweight; and performs favorably compared to the state-of-the-art.

Problem Formulation

One or more embodiments represent one or more protected attributes by a random variable A and an outcome variable by Y, making the common assumption that Y∈{0, 1} is binary-valued. It is assumed that A takes a finite number of values in a set A, corresponding to protected groups. Let X denote features used to predict Y in a supervised classification setting. Consider two scenarios in which X either includes or does not include A. While it is recognized that the former scenario can achieve better trade-offs between utility and fairness, the latter is needed in applications where disparate treatment laws and regulations forbid the explicit use of A. One or more embodiments work in the population limit and make use of probability distributions involving A, X, Y. These distributions are approximated, for example, using a training sample.

One or more embodiments focus on probabilistic classification in which the output of interest is the predicted probability of being in the positive class Y=1 rather than a binary prediction. The optimal probabilistic classifier is the conditional probability $r(x) \equiv p_{Y|X}((1|x)$, which we refer to as the original score. Bayes-optimal binary classifiers can be derived from r(x) by thresholding, specifically at level c∈[0, 1] if c and 1−c are the relative costs of false positive and false negative errors. Score functions will thus play a pertinent role.

One or more embodiments provide a mathematical formulation and method referred to as FairScoreTransformer (FST) that can be applied to both post-processing and pre-processing. In both cases, the goal is to transform r(x) into a transformed score r'(x) that satisfies fairness conditions while minimizing the loss in optimality compared to r(x). The application of FST to post-processing is carried out, for example, by using r'(x) directly as the classification output (it can be thresholded to provide a binary prediction if desired).

In the pre-processing case, we additionally define a transformed outcome variable Y'∈{0, 1} and let $r'(x)=p_{Y'|X}(1|x)$ be the conditional probability associated with it. The overall procedure includes two steps, performed in general by two different parties (although this is not a requirement): 1) The data owner transforms the outcome variable from Y to Y'; 2) The modeler trains a classifier with Y' as target variable and X as input, without regard for fairness. The transformed score r'(x) plays two roles in this procedure. The first is to specify the (randomized) mapping from X to Y' in step 1). As will be seen, the mapping depends only indirectly on Y through the original score r(x). The second role stems from the main challenge faced by pre-processing methods, namely that the predominant fairness metrics depend on the output of the classifier trained in step 2) but this classifier is not under direct control of the pre-processing in step 1). In recognition of this challenge, we employ the following assumption:

Assumption 1 (pre-processing). The classifier trained by the modeler approximates the transformed score r'(x) if it is a probabilistic classifier or a thresholded version of r'(x) if it is a binary classifier.

This assumption is satisfied for modelers who are "doing their job" in learning to predict Y' from X since the optimal classifier in this case is r'(x) or a function thereof. Given the assumption, use r'(x) as a surrogate for the actual classifier output. The assumption is not satisfied if the modeler is not competent or, worse, malicious in trying to discriminate against certain protected groups.

Utility Measure

One or more embodiments measure the loss in optimality, i.e. utility, between the transformed score r'(x) and original score r(x) using the following cross-entropy:

$$\mathbb{E}[-\log p_{Y'|X}(Y|X)] = \mathbb{E}[-r(X)\log r'(X) - (1-r(X))\log(1-r'(X))] \quad (1)$$

where the right-hand side results from expanding the expectation over Y conditioned on X, and $p_{Y'|X}$ is used only as notational shorthand in the post-processing case since Y' is not generated. For simplicity, also use the following notation for cross-entropy:

$$H_b(p,q) \triangleq -p\log q - (1-p)\log(1-q) \quad (2)$$

The use of log loss is well-motivated by the desire for r'(x) to be close to the true conditional probability r(x). An equivalent way to motivate (1) in the pre-processing context is to measure the utility lost in transformation by the Kullback-Leibler (KL) divergence between the original and transformed joint distributions $p_{X,Y}$, $p_{X,Y'}$:

$$D_{KL}(p_{X,Y} \| p_{X,Y'}) = \mathbb{E}_{p_{X,Y}}\left[\log \frac{p_{X,Y}}{p_{X,Y'}}\right] = \mathbb{E}_{p_{X,Y}}[\log p_{Y|X}] - \mathbb{E}_{p_{X,Y}}[\log p_{Y'|X}] \quad (3)$$

The first term depends on the data distribution but not r'(x) and the second term is exactly (1). Starting from a different premise, a similar mathematical formulation is possible in which the arguments of the KL divergence are reversed from those in (3), i.e. the given distribution is the second argument while the distribution to be determined is the first. The order of arguments in (3) is justified by the connection to log loss in classification.

Fairness Measure

One or more embodiments consider fairness criteria expressible as linear inequalities involving conditional means of scores, $$\sum_{j=1}^{J} b_{lj}\mathbb{E}[r'(X) | \mathcal{E}_{lj}] \leq c_l, l = 1, \ldots, L, \quad (4)$$

where $\{b_{lj}\}$ and $\{c_l\}$ are real-valued coefficients and the conditioning events $\mathcal{E}_{lj}$ are defined in terms of (A, X, Y) but do not depend on r'. Special cases of (4) correspond to the notions of statistical parity (SP) and equalized odds (EO). More precisely, focus on the following variant of SP:

$$-\epsilon \leq \mathbb{E}[r'(X)|A=a] - \mathbb{E}[r'(X)] \leq \epsilon \forall a \in \mathcal{A}, \quad (5)$$

which is referred to herein as mean score parity (MSP). Condition (5) corresponds to approximate mean independence of random variable R'=r'(X) with respect to A. Similar notions can also be put in the form of (4), for example bounds on the ratio $$1 - \epsilon \leq \frac{\mathbb{E}[r'(X) | A = a]}{\mathbb{E}[r'(X)]} \leq 1 + \epsilon, \quad (5A)$$

referred to as disparate impact. Conditional statistical parity can also be considered as appropriate.

For EO, add the condition Y=y to the conditioning events in (5), resulting in $$-\epsilon \leq \mathbb{E}[r'(X)|A=a,Y=y] - \mathbb{E}[r'(X)|Y=y] \leq \epsilon \forall a \in \mathcal{A},$$
$$y \in \{0,1\} \quad (6)$$

For y=0 (respectively y=1), E[r'(X)|Y=y] is the false (true) positive rate (FPR, TPR) generalized for a probabilistic classifier, and E[r'(X)|A=a; Y=y] is the corresponding group-specific rate. Refer to (6) for y=0 or y=1 alone as approximate equality in generalized FPRs or TPRs, and to (6) for y=0 and y=1 together as generalized EO (GEO).

Now specify the exact correspondences between (5), (6) and (4). The MSP constraint (5) can be obtained from (4) by setting J=2, l=(a, ±) for a∈ $\mathcal{A}$ where + corresponds to the ≤ε constraint and − to the ≥−ε constraint, L=2|$\mathcal{A}$|. $\varepsilon_{(a, \pm), 1}$={A=a}, $\varepsilon_{(a, \pm), 2}$=Ω|(the entire sample space), $c_l$=ε, and $b_{(a, \pm), j}$=∓$(-1)^j$. For the GEO constraint, set J=2, l=(a, $\mathcal{Y}$, ±0) for a∈$\mathcal{Y}$, $\mathcal{A}$ ∈{0, 1} and the same ± correspondences, L=4|$\mathcal{Y}$|, $\varepsilon_{(a, y, \pm), 1}$={A=a, Y=$\mathcal{Y}$}, $\varepsilon_{(a,y,\pm), 2}$={Y=$\mathcal{Y}$}, $c_l$=ε, and $b_{(a,y, \pm), j}$=∓$(-1)^j$.

The fairness measures (4) in one or more embodiments are defined in terms of probabilistic scores. Parallel notions defined for binary predictions, i.e. by replacing r'(X) with a thresholded version 1(r'(X)>t), are more common in the literature. For example, the counterpart to (6) is (non-generalized) EO while the counterpart to (5) is called thresholded score parity. While one or more embodiments do not optimize for these binary prediction measures, they can nevertheless be used for evaluation.

The form of (4) is less general than linear conditional moment constraints, which replace r'(X) in (4) by an arbitrary bounded function $g_j$(A, X, Y, r'(X)). Restriction to (4) allows a closed-form optimal solution to be derived. We note however that in many fairness measures, $g_j$(A, X, Y, r'(X))=r'(X), and the additional generality is not required.

Optimization Problem

The transformed score r'(x) is obtained by minimizing the cross-entropy in (1) (equivalently maximizing its negative) subject to fairness constraints (4):

$$\max_{r'} -\mathbb{E}[H_b(r(X), r'(X))] \text{ s.t. } \sum_{j=1}^{J} b_{lj}\mathbb{E}[r'(X) | \mathcal{E}_{lj}] \leq c_l, l = 1, \ldots, L \quad (7)$$

The next section presents an exemplary optimal solution to this problem.

Characterization of Optimal Fairness-Constrained Score

One or more embodiments employ a closed-form expression for the optimal solution to problem (7) using the method of Lagrange multipliers. The dual optimization problem that determines the Lagrange multipliers is stated herein. These results are specialized to the cases of MSP (5) and GEO (6). Define Lagrange multipliers $\lambda_l \geq 0$, l=1, . . . , L for the constraints in (7), and let $\lambda \triangleq (\lambda_1, \ldots, \lambda_L)$. Then the Lagrangian function is given by:

$$L(r', \lambda) = -\mathbb{E}[H_b(r(X), r'(X))] - \sum_{l=1}^{L}\sum_{j=1}^{J}\lambda_l b_{lj}\mathbb{E}[r'(X) | \mathcal{E}_{lj}] + \sum_{l=1}^{L} c_l \lambda_l \quad (8)$$

The dual optimization problem corresponding to (7) is $$\min_{\lambda \geq 0} \max_{r'} L(r', \lambda).$$

Note that L(r', λ) is a strictly concave function of r' and the fairness constraints in (7) are affine functions of r'. Consequently, as long as the constraints in (7) are feasible, the optimal transformed score r* can be found by (i) maximizing L(r', λ) with respect to r', resulting in an optimal solution r* that is a function of λ, and then (ii) minimizing L(r', λ) with respect to λ. Substituting the optimal λ* into the solution for r* found in the first step then yields the optimal transformed score. Note that this procedure would not necessarily be correct if a linear objective function were considered (e.g., 0-1 loss) due to lack of strict concavity. The next proposition states the general form of the solution to the inner maximization (i) above.

Proposition 1. Let L(r', λ) be as given in (8). Then for fixed λ, r*(λ)=arg $\max_{r'}$L(r', λ) is given by:

$$r^*(\mu(x); r(x)) = \begin{cases} \dfrac{1 + \mu(x) - \sqrt{(1 + \mu(x))^2 - 4r(x)\mu(x)}}{2\mu(x)}, & \mu(x) \neq 0 \\ r(x), & \mu(x) = 0, \end{cases} \quad (9)$$

where $$\mu(x) \triangleq \sum_{l=1}^{L}\sum_{j=1}^{J} \lambda_l b_{lj} \frac{Pr(\mathcal{E}_{lj} | X = x)}{Pr(\mathcal{E}_{lj})} \quad (10)$$

The optimal primal solution (9) can be interpreted as a prescription for score transformation controlled by μ(x), which is in turn a linear function of λ. When μ(x)=0, the score is unchanged from the original r(x), and as μ(x) increases or decreases away from zero, the score r*(μ(x); r(x)) decreases or increases smoothly from r(x) (as can be seen by plotting the function). It can also be shown that the transformed score r* has a rank-preserving property for fixed μ in the sense that if $r_1 < r_2$ then r*(μ; $r_1$)<r*(μ; r2). This can be shown by obtaining the partial derivative of r* with respect to r(x) and noting that it is non-negative, i.e. r* is an increasing function of r(x) for fixed μ(x).

The result of substituting the optimal primal solution (9) into the first two terms of the Lagrangian (8) is the expectation of the function $$g(\mu(x); r(x)) \triangleq -H_b(r(x), r^*(\mu(x);r(x))) - \mu(x)r^*(\mu(x);r(x)) \quad (11)$$

The dual problem is therefore $$\min_{\lambda} \mathbb{E}[g(\mu(X); r(X))] + \sum_{l=1}^{L} c_l \lambda_l \quad (12)$$

$$\text{s.t. } \mu(X) = \sum_{l=1}^{L}\sum_{j=1}^{J} \lambda_l b_{lj} \frac{Pr(\mathcal{E}_{lj} | X)}{Pr(\mathcal{E}_{lj})}, \lambda \geq 0$$

The solution to the above minimization provides the values of λ* for the optimal transformed score (9). Like all Lagrangian duals, (12) is a convex optimization (although it is no longer apparent from (12) that this is the case). Furthermore, (12) is typically low-dimensional in cases where the number of dual variables L is a small multiple of the number of protected groups |$\mathcal{A}$|. Now, specialize and simplify (12) to MSP (5) and GEO (6) fairness constraints. The following proposition follows from the correspondences between (5), (6) and (4).

Proposition 2. Under the MSP constraint (5), the dual optimization (12) reduces to:

$$\min_{\lambda} \mathbb{E}[g(\mu(X); r(X))] + \epsilon\|\lambda\|_1 \quad (13)$$

$$\text{s.t. } \mu(X) = \sum_{a \in \mathcal{A}} \lambda_a \left(\frac{p_{A|X}(a | X)}{p_A(a)} - 1\right).$$

For the GEO constraint (6), (12) reduces to:

$$\min_{\lambda} \mathbb{E}[g(\mu(X); r(X))] + \epsilon\|\lambda\|_1, \quad (14)$$

$$\text{s.t. } \mu(X) = \sum_{y \in \{0,1\}} \frac{p_{Y|X}(y|X)}{p_Y(y)} \sum_{a \in \mathcal{A}} \lambda_{a,y} \left(\frac{p_{A|X,Y}(a|X,y)}{p_{A|Y}(a|y)} - 1\right)$$

In (13), (14), there is no longer a non-negativity constraint on $\lambda$ but instead an $\ell_1$ norm, and the problem dimension is only $|\mathcal{A}|$ in (13) and $2|\mathcal{A}|$ in (14). Moreover, both dual formulations are well-suited for decomposition using the alternating direction method of multipliers (ADMM), as discussed further herein. In the case where the features X include the protected attribute A, we have $p_{A|X}(a|X) = p_{A|X,Y}(a|X, y) = 1(a=A)$, where A is the component of X that is given. The constraints in (13) and (14) then simplify to:

$$\mu(X) = \frac{\lambda_A}{p_A(A)} - \sum_{a \in \mathcal{A}} \lambda_a, \quad (15)$$

$$\mu(X) = \sum_{y \in \{0,1\}} \frac{p_{Y|X}(y|X)}{p_Y(y)} \left(\frac{\lambda_{A,y}}{p_{A|Y}(A|y)} - \sum_{a \in \mathcal{A}} \lambda_{a,y}\right) \quad (16)$$

respectively. Interestingly, the only difference between the cases of including or excluding A is that in the latter, the constraints in (13), (14) indicate that A should be inferred from the available features X and possibly Y, whereas in the former, A can be used directly.

Exemplary FairScoreTransformer Procedure

Now consider the finite sample setting in which the probability distributions of A, X, Y are not known and there is instead a training set $\mathcal{D}_n \triangleq \{(a_i, x_i, y_i), i=1, \ldots, n\}$. This section presents an exemplary FairScoreTransformer (FST) procedure that approximates the optimal fairness-constrained score. Focus is on the cases of MSP and GEO. The procedure includes the following steps: Estimate the original score and other probabilities required to define the dual problem (13) or (14). Solve the dual problem to obtain dual variables $\lambda^*$ (the "fit" step). Transform scores using (9) and (10) ("transform" step). For pre-processing, modify the training data. For binary-valued predictions, binarize scores. The following subsections elaborate on estimating, solving, and modifying training data for pre-processing. Score binarization can be done, for example, simply by selecting a threshold $t \in [0, 1]$ to maximize accuracy on the training set.

Estimation of Original Score and Other Probabilities

In some post-processing applications, original scores $r(x)$ may already be estimated by an existing base classifier. If no suitable base classifier exists, any probabilistic classification algorithm may be used to estimate $r(x)$. Logistic regression and gradient boosting machines are examples discussed elsewhere herein. A model and any hyperparameter values can be selected to maximize performance in this regard, i.e. to yield accurate and calibrated probabilities. This can be done through cross-validation on the training set using an appropriate metric such as Brier score or the like.

In the case where A is one of the features in X, the other probabilities required are $p_A(a)$ for MSP (13) and $p_Y(y)$, $p_{A|Y}(a|y)$ for GEO (14). Note that $(p_{Y|X}(y|x)$ is already given by $r(x)$ and $p_{A|X}$, $p_{A|X,Y}$ are delta functions. Since Y is binary and $|\mathcal{A}|$ is typically small, it suffices to use the empirical estimates of these probabilities. If A is not included in X, then it is also necessary to estimate it using $p_{A|X}(a|X)$ for MSP (13) and $p_{A|X,Y}(a|X, y)$ for GEO (14). Again, any probabilistic classification algorithm can be used, provided that it can handle more than two classes if $|\mathcal{A}|>2$. FST translates the effort of ensuring fair classification into training well-calibrated models for predicting Y and, if necessary, A.

ADMM for Optimizing Dual Variables

In the finite sample case, solve an empirical version of the dual problem in Proposition 2. Write $\mu(x) = \lambda^T f(x)$, where f: $X \to \mathbb{R}^d$ is defined by the expression for $\mu(x)$ in (13) or (14), and d is the dimension of $\lambda$. Let $\hat{r}(x)$ denote the estimate of $r(x)$, and $\hat{f}(x)$ be an empirical version of $f(x)$ in which all probabilities (e.g. $p_A(a)$ for MSP (13)) are replaced by their estimates. With these definitions, both optimizations in Proposition 2 have the general form:

$$\min_{\lambda \in \mathbb{R}^d} \frac{1}{n} \sum_{i=1}^{n} g(\mu(x_i); \hat{r}(x_i)) + \epsilon\|\lambda\|_1 \text{ s.t. } \mu(x_i) = \lambda^T \hat{f}(x_i), i = 1, \ldots, n, \quad (17)$$

where the expectation in the objective has also been approximated by the average over the training dataset. To simplify notation in this subsection, suppress the hat symbols on $\hat{r}(x)$ and $\hat{f}(x)$. Formulation (17) is well-suited for ADMM because the objective function is separable between $\mu(x)$ and $\lambda$, which are linearly related through the constraint. One exemplary ADMM decomposition is now presented; additional ones are presented below under "Alternative ADMM algorithms for the dual problem." Under the first decomposition, application of the scaled ADMM algorithm to (17) yields the following three steps in each iteration $k=0, 1, \ldots$:

$$\mu^{(k+1)}(x_i) = \quad (18)$$
$$\arg \min_{\mu} \frac{1}{n} g(\mu; r(x_i)) + \frac{\rho}{2} \left(\mu - \left(\lambda^{(k)}\right)^T f(x_i) + c^{(k)}(x_i)\right)^2 \forall i = 1, \ldots, n$$

$$\lambda^{(k+1)} = \arg \min_{\lambda} \epsilon\|\lambda\|_1 + \frac{\rho}{2} \sum_{i=1}^{n} \left(\mu^{(k+1)}(x_i) - \lambda^T f(x_i) + c^{(k)}(x_i)\right)^2 \quad (19)$$

$$c^{(k+1)}(x_i) = c^{(k)}(x_i) + \mu^{(k+1)}(x_i) - \left(\lambda^{(k+1)}\right)^T f(x_i) \forall i = 1, \ldots, n. \quad (20)$$

The first update (18) can be computed in parallel for each sample $x_i$ in the dataset. Given an $x_i$, finding $\mu(x_i)$ is a single-parameter optimization where the objective possesses closed-form expressions for its derivatives. For simplicity of notation, let $$r_i \triangleq r(x_i), \quad a_i \triangleq \left(\lambda^{(k)}\right)^T f(x_i) + c(x_i), \text{ and}$$

$$obj(\mu) \triangleq \frac{1}{n} g(\mu; r_i) + \frac{\rho}{2}(\mu - a_i)^2.$$

The first two derivatives of $obj(\mu)$ are:

$$\frac{\partial obj(\mu)}{\partial(\mu)} = -r^*(\mu; r_i) + \rho(\mu - a_i),$$

$$\frac{\partial^2 obj(\mu)}{\partial \mu^2} \begin{cases} -\frac{1}{2\mu^2}\left(1 - \frac{1 + \mu(1 - 2r_i)}{\sqrt{(1+\mu)^2 - 4r_i\mu}}\right) + \rho, & \mu \neq 0, \\ -r(1-r) + \rho, & \mu = 0. \end{cases}$$

The above expressions are useful whether (18) is solved by a generic optimization solver or a root-finding method (e.g., Newton's method). The second update (19) reduces to an $\ell_1$-penalized quadratic minimization over (at most) 2|A| variables. Specifically:

$$\lambda^{(k+1)} = \arg\min_{\lambda} \epsilon \|\lambda\|_1 + \lambda^T v + \lambda^T F \lambda, \quad (21)$$

$$v \triangleq -\rho \sum_{i=1}^{n} f(x_i)(\mu^{(k+1)}(x_i) + c^{(k)}(x_i)), \quad F \triangleq \frac{\rho}{2} \sum_{i=1}^{n} f(x_i) f(x_i)^T. \quad (22)$$

The values of v and F above can be pre-computed prior to solving (21). In fact, F can be computed once at the start of the iterations. The ensuing minimization only involves $|\mathcal{A}|$ variables under the MSP constraint (5), and 2|A| variables under the GEO constraint (6). From (18)(20), it is seen that the computational complexity of each ADMM iteration scales linearly with n. The ADMM penalty parameter can be fixed at $\rho=1$, for example, or if desired, can be tuned for faster convergence.

Additional Steps for Pre-Processing

In the pre-processing scenario, the transformed score r'(x) is used to generate samples of a transformed outcome Y'. Since $r'(x) = p_{Y'|X}(1|x)$ is a probabilistic mapping, one or more embodiments generate a weighted dataset $\mathcal{D}' = \{(x_i, y'_i, w_i)\}$ with weights $w_i$ that reflect the conditional distribution $p_{Y'|X}$. Specifically:

$\mathcal{D}' = \mathcal{D}'_0 \cup \mathcal{D}'_1$ with $\mathcal{D}'_0 = \{(x_i, 0, 1-r'(x_i)), i=1,\ldots,n\}$ and $\mathcal{D}'_1 = \{(x_i, 1, r'(x_i)), i=1,\ldots,n\}$ so that D' is twice the size of the original dataset. The data owner passes the transformed dataset D' to the modeler, who uses it to train a classifier for Y' given X without fairness constraints.

EXPERIMENTS

Non-limiting exemplary experimental evaluation of the proposed FST methods for MSP and GEO constraints and both pre- and post-processing will now be presented.

Datasets: Four datasets were used, the first three of which are standard in the fairness literature: 1) adult income, 2) ProPublica's COMPAS recidivism, 3) German credit risk, 4) Medical Expenditure Panel Survey (MEPS). Specifically, versions pre-processed by an open-source library for algorithmic fairness were used. To facilitate comparison with other methods, binary-valued protected attributes were used and gender and race were considered for both adult and COMPAS, age and gender for German, and race for MEPS. Each dataset was randomly split ten times into training (75%) and test (25%) sets and all methods were subject to the same splits.

Methods compared: Since FST is intended for post- and pre-processing, comparisons to other post- and preprocessing methods are most natural as they accommodate situations a) when it is not possible or desirable to modify an existing classifier (only post-processing is possible); b) when freedom is desired to select the most suitable classifier for an application, whether it maximizes performance or has some other desired property such as interpretability (post- and pre-processing apply); and c) when standard training algorithms are used without the additional complexity of accounting for fairness (post- and pre-processing again). For post-processing, we chose M. Hardt, E. Price, and N. Srebro, "Equality of opportunity in supervised learning," in Advances in Neural Information Processing Systems (NeurIPS), December 2016, pp. 3323-3331 (HPS) and the reject option method of F. Kamiran, A. Karim, and X. Zhang, "Decision theory for discrimination-aware classification," in IEEE 12* International Conference on Data Mining (ICDM), December 2012, pp. 924-929, both as implemented in R. K. E. Bellamy, K. Dey, M. Hind, S. C. Hoffman, S. Houde, K. Kannan, P. Lohia, J. Martino, S. Mehta, A. Mojsilovic, S. Nagar, K. N. Ramamurthy, J. Richards, D. Saha, P. Sattigeri, M. Singh, K. R. Varshney, and Y. Zhang, "AI Fairness 360: An extensible toolkit for detecting, understanding, and mitigating unwanted algorithmic bias," October 2018, as well as the Wass-1 Post-Process $\hat{p}s$ method (WPP) of R. Jiang, A. Pacchiano, T. Stepleton, H. Jiang, and S. Chiappa, "Wasserstein fair classification," in Conference on Uncertainty in Artificial Intelligence (UAI), July 2019, pp. 1-10. For pre-processing, the massaging and reweighing methods of F. Kamiran and T. Calders, "Data preprocessing techniques for classification without discrimination," Knowledge and Information Systems, vol. 33, no. 1, pp. 1-33, October 2012 and the optimization method of F. Calmon, D. Wei, B. Vinzamuri, K. Natesan Ramamurthy, and K. R. Varshney, "Optimized pre-processing for discrimination prevention," in Advances in Neural Information Processing Systems (NeurIPS), December 2017, pp. 3992-4001 (OPP) were chosen. Among in-processing methods, meta-algorithms that work with essentially any base classifier can handle situation b). The reductions method A. Agarwal, A. Beygelzimer, M. Dudík, J. Langford, and H. Wallach, "A reductions approach to fair classification," in Proceedings of the 35th International Conference on Machine Learning (ICML), July 2018, pp. 60-69 ('red' in FIGS. 6-8) was selected from this class. We also compared to in-processing methods specific to certain types of classifiers, which do not allow for any of a)-c): fairness constraints (FC) M. B. Zafar, I. Valera, M. G. Rogriguez, and K. P. Gummadi, "Fairness Constraints: Mechanisms for Fair Classification," in Proceedings of the 20th International Conference on Artificial Intelligence and Statistics (AISTATS), April 2017, pp. 962-970; disparate mistreatment (DM) M. B. Zafar, I. Valera, M. Gomez Rodriguez, and K. P. Gummadi, "Fairness beyond disparate treatment & disparate impact: Learning classification without disparate mistreatment," in Proceedings of the 26th International Conference on World Wide Web (WWW). International World Wide Web Conferences Steering Committee, 2017, pp. 1171-1180; and fair empirical risk minimization (FERM) M. Donini, L. Oneto, S. Ben-David, J. S. Shawe-Taylor, and M. Pontil, "Empirical risk minimization under fairness constraints," in Advances in Neural Information Processing Systems (NeurIPS), December 2018, pp. 2791-2801. Availability of code was a pertinent criterion. Reference is made to the table of FIG. 5.

The methods in the previous paragraph have various limitations, summarized in the table of FIG. 5, that affect the design of the experiments. First, the post-processing methods M. Hardt et al.; F. Kamiran, A. Karim, and X. Zhang; and R. Jiang et al. (specifically the WPP variant for the last one) require knowledge of the protected attribute A at test time. Accordingly, the experiments presented in this section include A in the features X to make it available to all methods. Three versions of FST were evaluated: post-processing (FSTpost), pre-processing (FSTpre), and a second post-processing version (FSTbatch) that assumes that test instances can be processed in a batch rather than one by one. In this case, the fitting of the dual variables that parametrize FST can actually be done on test data since it does not depend on labels $y_i$ (and uses only predicted probabilities for A if A is unavailable at test time).

Base classifiers: We used $\ell_1$-regularized logistic regression (LR) and gradient boosted classification trees (GBM) from scikit-learn as base classifiers. These are used in different ways depending on the method: Post-processing methods operate on the scores produced by the base classifier, pre-processing methods train the base classifier after modifying the training data, and the reductions method repeatedly calls the base classification algorithm with different instance-specific costs. We used linear SVMs (with Platt scaling to output probabilities) to compare with FERM. We found it impractical to train nonlinear SVMs on the larger datasets for reductions and FERM since reductions needs to do so repeatedly and FERM uses a slower specialized algorithm. For a similar reason, 5-fold cross-validation to select parameters for LR (regularization parameter C from $[10^{-4}; 10^4]$) and GBM (minimum number of samples per leaf from $\{5; 10; 15; 20; 30\}$ —try these five values for the min samples/leaf parameter and choose the one that yields the best accuracy on the validation set for each data set) was done only once per training set. All other parameters were set to the scikit-learn defaults. The base classifier was then instantiated with the best parameter value for use by all methods.

Metrics: Classification performance and fairness were evaluated using both score-based metrics (Brier score, AUC, differences in mean scores (MSP) and GEO) and binary label-based metrics (accuracy, differences in mean binary predictions (SP) and non-generalized EO). We account for the fact that the reductions method returns a randomized classifier, i.e. a probability distribution over a set of classifiers. For the binary label-based metrics, we used the methods provided with the code for reductions. The score-based metrics were computed by evaluating the metric for each classifier in the distribution and then averaging weighted by their probabilities.

Figure 6:
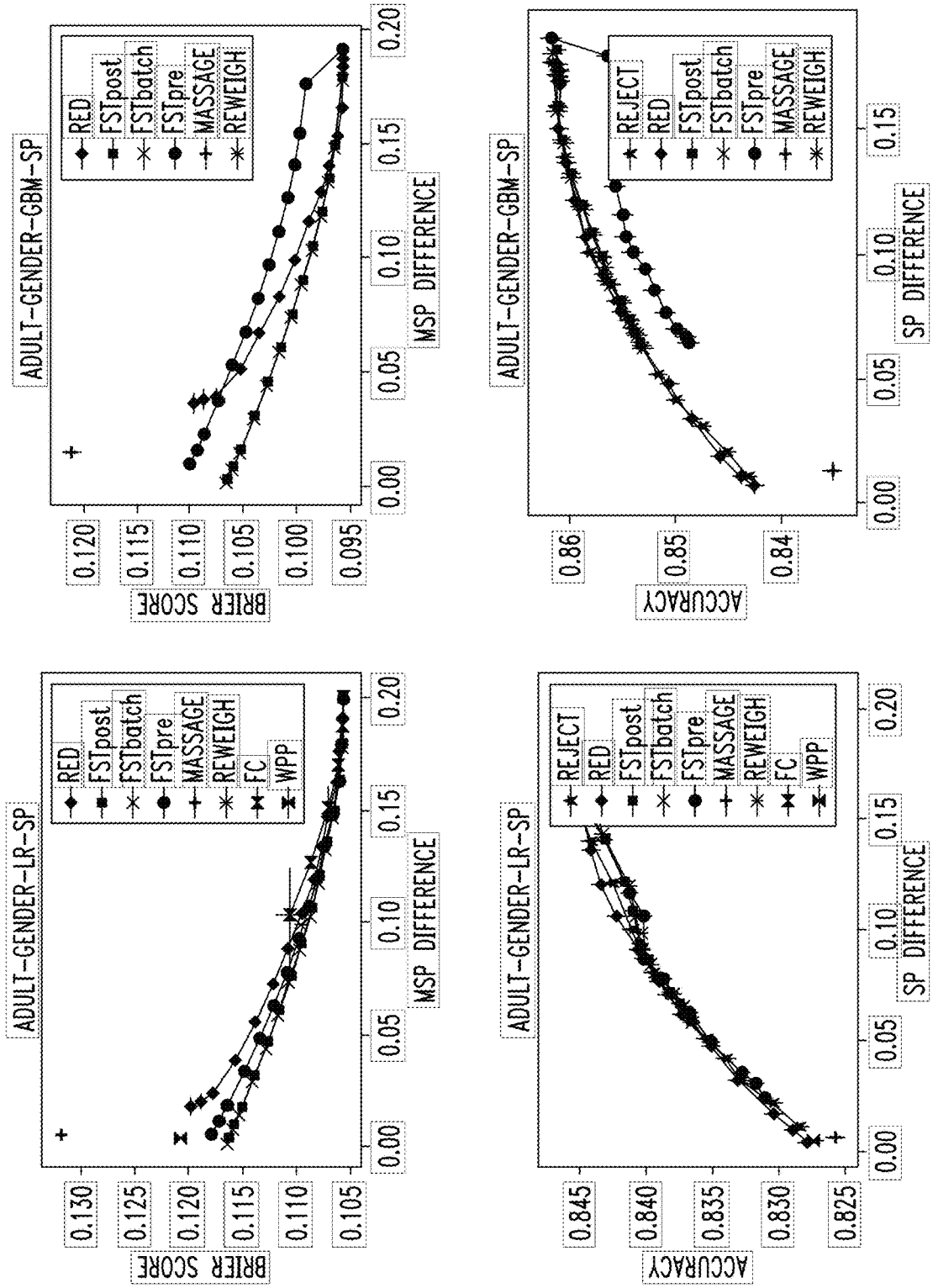
FIGS. 6, 7, and 8 present exemplary experimental results.
Figure 6:
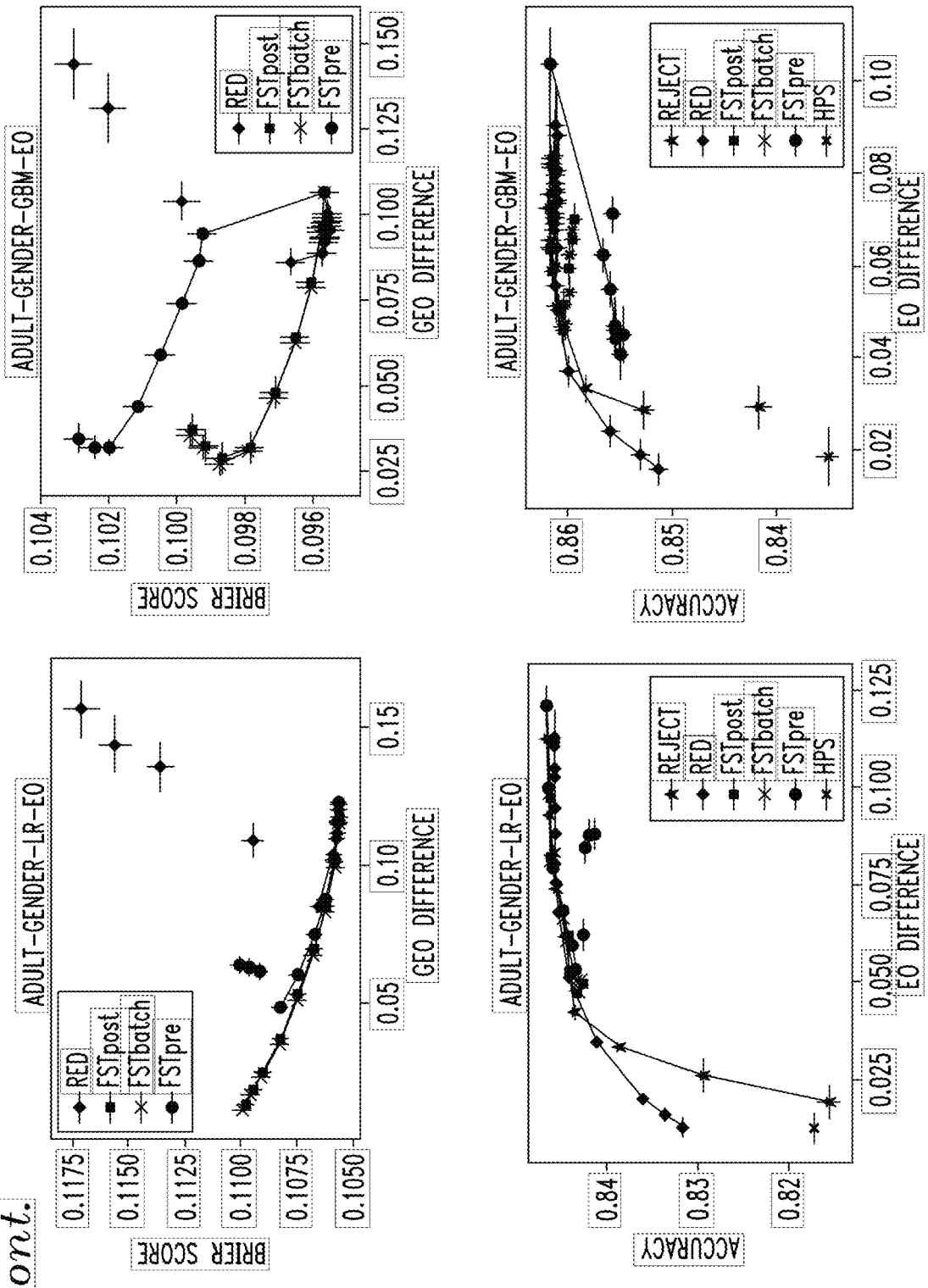
Figure 7:
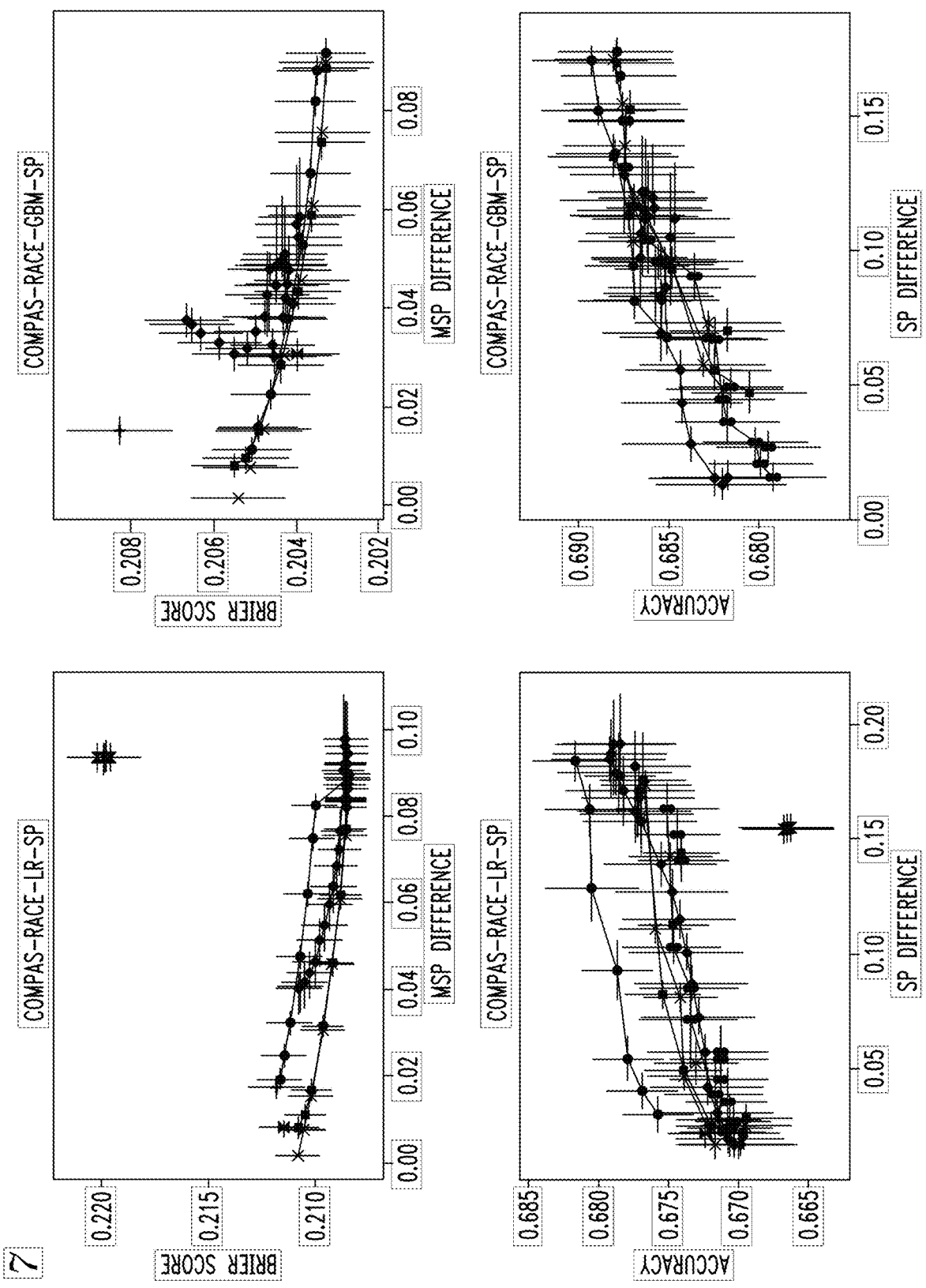
Figure 7:
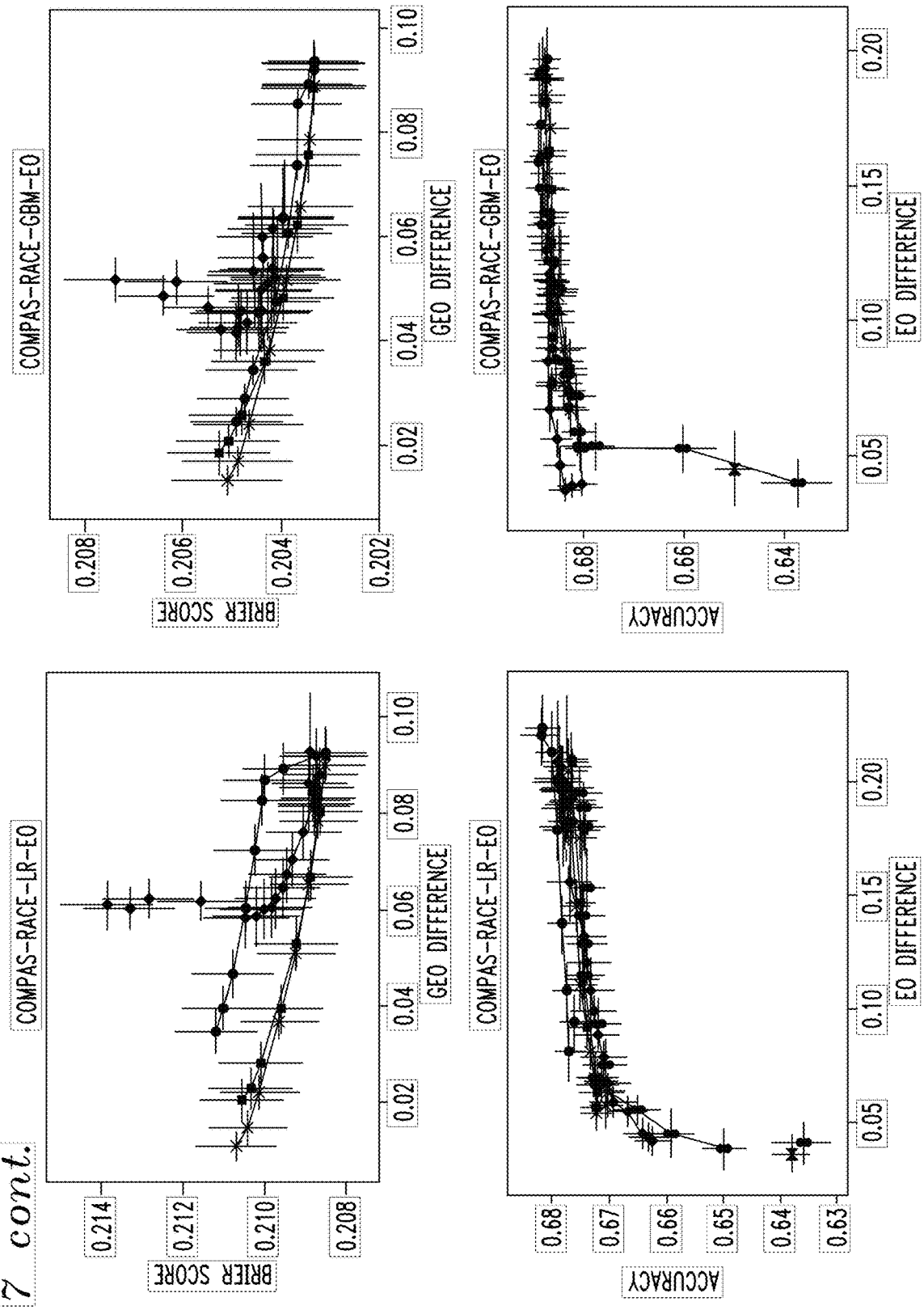
Figure 8:
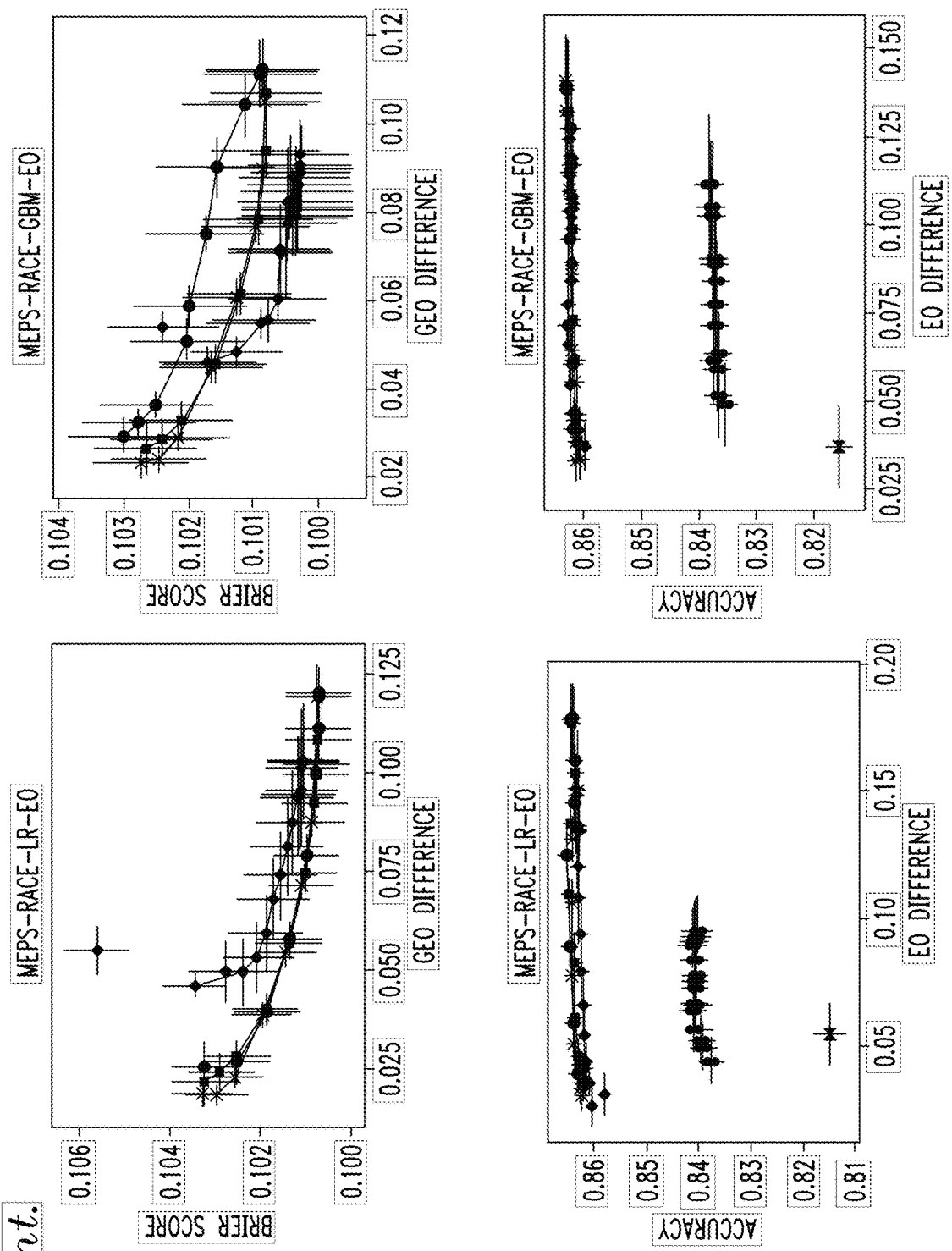

Results FIGS. 6, 7 and 8 show the trade-offs between classification performance and fairness. These results show cases where protected attributes ARE available at test time to enable comparison to prior art methods. The first row of FIG. 6 shows Brier score on the vertical axis, and considers two fairness criteria, MSP (mean score parity) difference (MSP difference=disparity), and GEO (generalized equalized odds) difference (GEO difference=disparity). "Adult" refers to the dataset; "gender" refers to the protected attribute that fairness is measured with respect to. LR and GBM are two types of classifiers; with respect to SP and EO, refer to the x-axis labels. The second row in FIG. 6 shows accuracy instead of Brier score. The x-axis is different as well; the first row metrics are based on scores, while in the second row x and y axes are both based on binary output. FIGS. 7 and 8 are analogous to FIG. 6 but the protected class is race instead of gender and a different data set is employed in each case (COMPAS in FIG. 7, MEPS in FIG. 8). The symbols show the methods being compared (e.g., red, FSTpost, FSTbatch, . . . ) and are consistent throughout. The columns in each of FIGS. 6, 7, and 8 correspond to combinations of base classifier (LR, GBM) and fairness measure targeted (SP, EO). Markers indicate mean values over the ten splits, error bars indicate standard errors in the means, and Pareto-optimal points have been connected with line segments to ease visualization.

Considering first the score-based plots (top rows of FIGS. 6, 7, and 8), FSTpost and FSTbatch achieve trade-offs that are at least as good as all other methods, with the slight exception of the GBM case on MEPS. In all cases, the advantage of FST lies in extending the Pareto frontiers farther to the left, attaining smaller MSP or GEO differences; this is especially apparent for GEO. FSTpre sometimes performs less well, e.g. with GBM on adult and MEPS, likely due to the loss incurred in approximating the transformed score r'(x) with the output of a classifier fit to the pre-processed data.

Turning to the binary label-based plots (bottom rows of FIGS. 6, 7, and 8), the trade-offs for FSTpost and FSTbatch generally coincide with or are close to the trade-offs of the best method, and are even sometimes the best, despite not optimizing for binary metrics beyond tuning the binarization threshold for accuracy. Again FSTpre with GBM is worse on adult, but FSTpre with LR is the best performer on COMPAS. The main disadvantage of FST is that its trade-off curves may not extend as far to the left as other methods, in particular on adult. This is the converse of its advantage for score-based metrics.

Among the existing methods, reductions ('red') is the strongest and also the most versatile, handling all cases that FST does. However, it is an in-processing method and far more computationally expensive, requiring an average of nearly 30 calls to the base classification algorithm compared to one for FSTpost, FSTbatch and two for FSTpre. Reductions also returns a randomized classifier, which may not be desirable in some applications. The post-processing methods are not designed to output scores and hence are omitted from the score-based plots. Reject option performs close to the best except on MEPS and at small unfairness values.

HPS is limited to EO, does not have a parameter to vary the trade-off, and is less competitive. WPP and the pre-processing methods, massaging and reweighing, likewise do not have a trade-off parameter and are limited to SP. Massaging is often dominated by other methods while reweighing lies on the Pareto frontier but with substantial disparity. WPP results in low disparity but its Brier score or accuracy is sometimes less competitive. FC applies only to the LR-SP column and could not substantially reduce unfairness, possibly due to the larger feature dimension.

In employing one or more embodiments, it should be noted that some aspects of FST depend on well-calibrated classifiers that approximate $p_{Y|X}$ and, if necessary, $p_{A|X}$ or $p_{A|X,Y}$. A poorly calibrated model (e.g., due to lack of samples) may lead to transformed scores that do not achieve the target fairness criteria, so a well-calibrated model should be employed where available. Second, it should be kept in mind that thresholding the transformed scores may have an adverse impact on fairness guarantees. Finally, it should also be kept in mind that, like most pre- and post-processing methods, the score transformation found by the FST is vulnerable to distribution shifts between training and deployment.

One or more embodiments thus provide a fairness-ensuring score transformation method referred to herein as FairScoreTransformer. This technique can handle fairness criteria given in terms of linear inequalities involving conditional means of scores (cf. (4)) and minimizes the cross-entropy between the original and the transformed scores (2). FST is based on the optimization problem (7) which, in turn, has a dual form that can be efficiently solved using the ADMM algorithm. Exemplary explicit instantiations of the FairScoreTransformer method for MSP and GEO fairness constraints are provided in Proposition 2. Moreover, via a comprehensive set of experiments, it has been demonstrated that FST is either as competitive or outperforms several existing fairness intervention mechanisms over a range of constraints and datasets. Future directions include characterizing convergence rates for the ADMM iterations and adapting FairScoreTransformer to fairness criteria that are not based on conditional expectation of scores (e.g., calibration across groups) as well as to non-binary outcomes Y.

Alternative ADMM Algorithms for the Dual Problem

This section presents alternative ADMM decompositions for the dual problems corresponding to MSP (13) and GEO (14).

Mean score parity: Define auxiliary variables $\tilde{\lambda}_a$ as follows:

$$\tilde{\lambda}_a = \frac{\lambda_a}{p_A(a)} - \sum_{a' \in \mathcal{A}} \lambda_{a'}, \, a \in \mathcal{A} \quad (23)$$

with $\tilde{\lambda} = (\tilde{\lambda}_a) a \in \mathcal{A}$. Then, the empirical version of (13) can be written as:

$$\min_{\lambda, \tilde{\lambda}} \frac{1}{n} \sum_{i=1}^{n} g(\mu_i; r_i) + \epsilon \|\lambda\|_1 \quad (24)$$

$$\text{s.t. } \mu_i = \sum_{a \in \mathcal{A}} p_{A|X}(a \mid x_i) \tilde{\lambda}_a$$

where $\mu_i = \mu(x_i)$, $r_i = r(x_i)$, and $\lambda$ and $\tilde{\lambda}$ are regarded as two sets of optimization variables that are linearly related through (23). Let $B \in \mathbb{R}^{n \times d}$ be a matrix with entries $B_{i,a} = p_{A|X}(a|x_i)$ and rows $b_i^T$ so that we may write $\mu = B\tilde{\lambda}$, $\mu_i = b_i^T \tilde{\lambda}$. The objective function in (24) is therefore separable between $\lambda$ and $\tilde{\lambda}$. With 1 denoting a vector of ones and $P_A$ the d×d diagonal matrix with diagonal entries $p_A(a)$, a scaled ADMM algorithm for (24) includes the following three steps in each iteration $k=0, 1, \ldots$:

$$\tilde{\lambda}^{k+1} = \arg\min_{\tilde{\lambda}} \frac{1}{n} \sum_{i=1}^{n} g(b_i^T \tilde{\lambda}; r_i) + \frac{\rho}{2} \|\tilde{\lambda} - (P_A^{-1} - 11^T)\lambda^k + u^k\|_2^2 \quad (25)$$

$$\lambda^{k+1} = \arg\min_{\lambda} \epsilon \|\lambda\|_1 + \frac{\rho}{2} \|(P_A^{-1} - 11^T)\lambda - \tilde{\lambda}^{k+1} - u^k\|_2^2 \quad (26)$$

$$u^{k+1} = u^k + \tilde{\lambda}^{k+1} - (P_A^{-1} - 11^T)\lambda^{k+1}. \quad (27)$$

The optimization in (26) is an $\ell_1$-penalized quadratic minimization and can be handled by many convex solvers. The optimization in (25) can be solved using Newton's method. Below are given the gradient and Hessian of the first term in (25); the second Euclidean norm term is standard. First, using the definition of $g(\mu; r)$ in (11), find that:

$$\frac{dg(\mu; r)}{d\mu} = -r^*(\mu; r) \quad (28)$$

$$\frac{d^2 g(\mu; r)}{d\mu^2} = -\frac{dr^*(\mu; r)}{d\mu} = \begin{cases} \frac{1}{2\mu^2}\left(1 - \frac{1 + (1-2r)\mu}{\sqrt{(1+\mu)^2 - 4r\mu}}\right), & \mu \neq 0 \\ r(1-r), & \mu = 0. \end{cases} \quad (29)$$

The simple form in (28) is due to $r^*(\varphi; r)$ satisfying the optimality condition (24) and the ensuing cancellation of terms. The gradient and Hessian of the first term in (25) are then given by $$\nabla\left(\frac{1}{n}\sum_{i=1}^{n} g(b_i^T \tilde{\lambda}; r_i)\right) = -\frac{1}{n} B^T r^* \quad (30)$$

$$\nabla^2\left(\frac{1}{n}\sum_{i=1}^{n} g(b_i^T \tilde{\lambda}; r_i)\right) = -\frac{1}{n} B^T H B, \quad (31)$$

where $r^*$ is the n-dimensional vector with components $r^*(\mu_i; r_i)$ and H is the n×n diagonal matrix with entries $dr^*(\mu_i; r_i) = d\mu_i$. In the case where the features X include the protected attribute A, $p_{A|X}(a|x_i) = 1(a = a_i)$, B is a sparse matrix with a single one in each row, and the Hessian in (31) is diagonal. This implies that optimization (25) is separable over the components of $\tilde{\lambda}$.

Generalized Equalized Odds

In analogy with 23 define $$\tilde{\lambda}_{a,y} = \frac{\lambda_{a,y}}{p_{A|Y}(a \mid y)} - \sum_{a' \in \mathcal{A}} \lambda_{a',y}, \, a \in \mathcal{A}, \, y \in \{0, 1\}. \quad (32)$$

Again let B be a n×d matrix, recalling that $d = 2|\mathcal{A}|$ in the GEO case, with columns indexed b a, and entries $$B_{i,(a,y)} = \begin{cases} \frac{(1 - r(x_i)) p_{A|X,Y}(a \mid x_i, 0)}{p_Y(0)}, & y = 0 \\ \frac{r(x_i) p_{A|X,Y}(a \mid x_i, 1)}{p_Y(1)}, & y = 1. \end{cases} \quad (33)$$

It can then be seen from the constraint in (14) that $\mu_i = b_i^T \tilde{\lambda}$ as before and the empirical version of (14), $$\min_{\lambda, \tilde{\lambda}} \frac{1}{n} \sum_{i=1}^{n} g(b_i^T \tilde{\lambda}; r_i) + \epsilon \|\lambda\|_1 \quad (34)$$

is separable between $\lambda$ and $\tilde{\lambda}$ subject to the linear relation (32). With $P_{A|y}$ for $y=0, 1$ denoting the $|\mathcal{A}| \times |\mathcal{A}|$ diagonal matrix with diagonal entries $p_{A|Y}(a|y)$, the three steps in each ADMM iteration for (34) are as follows:

$$\tilde{\lambda}^{k+1} = \arg\min_{\tilde{\lambda}} \frac{1}{n} \sum_{i=1}^{n} g(b_i^T \tilde{\lambda}; r_i) + \frac{\rho}{2} \sum_{y=0}^{1} \|\tilde{\lambda}_{\cdot,y} - (P_{A|y}^{-1} - 11^T)\lambda_{\cdot,y}^k + u_{\cdot,y}^k\|_2^2 \quad (35)$$

$$\lambda_{\cdot,y}^{k+1} = \arg\min_{\lambda} \epsilon \|\lambda\|_1 + \frac{\rho}{2} \|(P_{A|y}^{-1} - 11^T)\lambda - \tilde{\lambda}_{\cdot,y}^{k+1} - u_{\cdot,y}^k\|_2^2, \, y = 0, 1 \quad (36)$$

$$u_{\cdot,y}^{k+1} = u_{\cdot,y}^k + \tilde{\lambda}_{\cdot,y}^{k+1} - (P_{A|y}^{-1} - 11^T)\lambda_{\cdot,y}^{k+1}, \, y = 0, 1, \quad (37)$$

where $\tilde{\lambda}_{\cdot,y}$, $\lambda_{\cdot,y}$, and $u_{\cdot,y}$ are $|\mathcal{A}|$-dimensional subvectors of $\tilde{\lambda}$, $\lambda$ and u consisting only of components with $y=0$ or $y=1$. The optimization in (35) is of the same form as (25) and can also be solved using Newton's method. The same expressions (30), (31) hold for the gradient and Hessian of the first term in (35), where B is now given by (33). The optimization of X in (36) is separable over $y=0, 1$ and is the same as step (26) for MSP.

Thus, fair classification deals with the classification of examples into two (or more) classes by supervised machine learning (ML), and, in particular, to the fairness of classification output or performance with respect to protected attributes. While examples thus far have addressed two classes, aspects of the invention can, in general, be applied to two or more classes. In probabilistic classification, predicted class probabilities are of primary interest as opposed to hard (binary) predictions.

One non-limiting example of an application is loan approval. It may be desired for the approval rate or measures of accuracy (i.e. approved people repay; disapproved people would have defaulted) to be similar for different groups. Outputs in one or more embodiments are not binary (i.e. accept/reject) but rather reflect the probability of being in one of the classes (probabilistic output is referred to herein as "scores" to distinguish from binary).

In one or more embodiments, given predicted probabilities (scores) from an existing classifier, transform the scores to satisfy fairness constraints while minimizing loss in utility; in a post-processing mode, use transformed scores as classification output; or in a pre-processing mode: generate modified training data, train a new classifier on this data using a standard, non-fairness-constrained algorithm, and the resulting classifier will be more fair. One or more embodiments work with a variety of existing classifiers. The selected existing classifier produces the predicted probabilities (scores). One example of utility is, e.g., whether people will repay their loans.

In general, fairness constraints can be any linear inequalities in conditional means of scores. See, e.g., Eq. 4. Mean score parity constrains the mean score given to different groups to be equal (within a tolerance E). See, e.g., Eq. 5. A false positive occurs when someone is identified as a positive but is truly a negative, i.e., will truly default on the loan, but the person is approved anyway. False positive rate parity says that the rate of false positives should be approximately equal across different groups; i.e., one group should not get the benefit of the doubt more than another group. Refer to Eq. 6. Utility can be measured, e.g., by cross-entropy with respect to the original score (optimal unconstrained).

Most existing post-processing methods produce binary output, not scores; require protected attributes at test time; and address only one or two fairness measures. With regard to pre-processing methods, early methods address only demographic parity, while representation learning/adversarial methods typically lose semantics of the original data domain and are computationally challenging and unstable. IN-processing changes the classifier itself as opposed to leaving the classifier alone and taking some action before or after. These lack flexibility—not all algorithms can be adapted in this manner. In contrast, embodiments of the invention treat the classifier as a black box. In this regard, the skilled artisan will be familiar with many different types of classifiers that can be used with embodiments of the invention; aspects of the invention are agnostic to the particular type of classifier. Non-limiting examples of suitable classifiers include: logistic regression models, gradient boosted models (GBM), and support vector machines; even neural networks are good provided their predicted probabilities are calibrated.

Further with regard to existing post processing methods, requiring protected attributes at test time refers to a condition wherein, when the model is used to score new individuals, it is necessary to know their protected group status. In contrast, one or more embodiments can advantageously estimate protected group status from the other data available. One or more embodiments produce continuous rather than binary outputs. In one or more embodiments, since protected attributes are not needed at test time, advantageously, it is possible to switch between pre- and post-processing, and the same algorithm can be used for both. See discussion of FIGS. 3 and 4. Also, in one or more embodiments, protected attributes are not needed at test time.

Advantageously, one or more embodiments produce predicted probabilities (scores); permit post- and pre-processing allowing freedom in choice of classifier/algorithm; address a variety of fairness measures including the most popular ones; do not require protected attributes at test time; and/or are computationally lightweight. This latter benefit is achieved, for example, because a closed-form expression is available for optimal transformed scores, and a low-dimensional convex optimization is used for transformation parameters. Probabilistic scores are believed to be better than binary approaches since, for example, they provide confidences in predictions, e.g. "positive with 90% confidence" vs. just "positive." Another point is that if the probabilistic score is in turn an input to a subsequent decision-making process (human or machine) with other inputs, it provides more information than a binary value. The quality of being computationally lightweight means that the same accuracy can be obtained with fewer CPU cycles. It is also believed that better accuracy can be obtained with the same number of CPU cycles; for example if an alternative more expensive method has to be terminated early after a set number of CPU cycles.

Exemplary applications of one or more embodiments include high-stakes domains where predictions affect humans, such as Finance, Healthcare, and Criminal justice. Specific example applications include credit approval, medical treatment decisions, and criminal risk assessment.

By way of review of the FairScoreTransformer procedure, in a first step, provide input predicted probabilities or scores. They can be done with an existing classifier, if available, otherwise, a classifier can be trained to do this. To estimate the probabilities, the original score $r(x)=p_{Y|X}(1|x)$ is estimated using a probabilistic classifier (e.g. logistic regression). Other required probabilities include, e.g., distribution of groups $p_A(a)$. The distribution of groups refers to what proportion of population is Group 1, Group 2, etc. Please note, reference is made to first, second, third, and fourth steps but the reference is made to the order of steps in this particular exemplary embodiment and is not intended to be limiting.

In a second "fit" step, determine the parameters (that control transformation). The scores are parameterized or controlled by a set of parameters called $\lambda$. Here they are Lagrange multipliers. The second step adjusts the $\lambda$ values such that they satisfy the fairness constraints more closely. Refer to Eq. (12). Low-dimensional convex optimization is possible because the number of $\lambda$ parameters is equal, for example, to the number of groups, or twice their number.

In a third "transform" step, transform the scores in closed form. Refer to Eq. (9) and (10). Once the $\lambda$ parameters are available, the transformed scores are available in closed form and thus, no iteration is needed. Substitute $\lambda$ into Eq. (10) to obtain $\mu$ and then substitute $\mu$ into Eq. (9) to obtain the new scores. "Pr" refers to probability. The $\varepsilon_{ij}$ are abstract events.

In a fourth step, for pre-processing mode only, generate weighted training data using $r^*(x)$. For post-processing, stop after the third step. For pre-processing, use new score $r^*(x)$ to generate new training data. Specifically, weight the existing training data. For example, in one example, one training example within the training data could receive a weight of "2" which is equivalent to duplicating it; i.e., having that example occur twice, thus giving it twice the importance that it had before. Weighting does not necessarily require integer values; for example, a weight of 2.3 could be assigned indicating that the prior example is deemed to be 2.3 times more important than before. Most algorithms can handle non-integer weights.

In a non-limiting example, code implementing the fit and transform steps can be written in Python and structured as a Python class; other languages could be used in other embodiments. As discussed elsewhere, experiments were carried out comparing FST to ten existing methods on four datasets. For score-based metrics (Brier score, AUC), FST obtains better fairness-utility trade-offs. For binary label-based metrics (accuracy), FST remains competitive despite not optimizing for these metrics.

One or more embodiments are applicable, for example, to a human population having two or more classes, at least one of which is a legally protected class. Aspects of the invention are not, however, limited to legally protected classes, but can be used wherever fairness is desired.

One or more embodiments provide a system, method, and/or computer program product that takes predicted probabilities (scores) as input and transforms them. Input scores come, for example, from a given classifier. Output scores satisfy fairness constraints. Constraints are linear inequalities on conditional means of scores, e.g. demographic parity, equalized odds. Output scores are used directly as classification output, or to generate modified training data for training a classifier.

In one or more embodiments, a computer implementing aspects of the invention works more efficiently, because the complexity of the algorithm is lower as compared to prior art techniques. One or more embodiments provide a switch to toggle between pre- and post-processing modes. Many practical applications are possible. For example, trigger a signal to send the modified training data to a classifier and instruct the classifier to retrain itself. In another aspect, control a physical system. For example, suppose some group is discriminated against in providing electric power during brownouts or water during droughts. This could, but need not be, in a case where an ML algorithm decides how to conduct the brownout or control the water supply. Another aspect relates to restaurants supplying food to first responders during a crisis; it may be desirable to make sure that each restaurant gets some business. An even further aspect is related to preventing discrimination in the allocation of emergency resources (fire, police, ambulance, emergency room/clinic, and the like)—any kind of geographic allocation of resources. Aspect can be used for decisions impacting individuals (e.g. loans) or groups (e.g. decisions in the criminal justice system).

Prior art post processing techniques typically produce only binary output and not scores. One or more embodiments are carried out without the need for calibrated probability estimates; however, other embodiments could use such estimates if desired. One or more embodiments do not require knowledge of the protected attribute at test time. In contrast to one or more embodiments, prior art representation learning does not preserve the original data domain and its semantics, while prior art adversarial algorithms can be computationally challenging. One or more embodiments need to solve only one instance of a subproblem. One or more embodiments advantageously compute the Lagrange multipliers that parametrize the solution. An in-processing method for fair supervised machine learning is one that produces a new model from training data by modifying the training algorithm to account for fairness criteria. In-processing methods require training data and may be restricted to certain classes of machine learning models (e.g. linear models or neural networks). One or more embodiments can be used as a post-processing method, which takes the output of any existing machine learning classifier and modifies it to satisfy fairness constraints. One or more embodiments can also be used for pre-processing, i.e. to modify training data for training models.

Given the discussion thus far, and referring to FIGS. 3 and 4, it will be appreciated that, in general terms, an exemplary method, according to an aspect of the invention, includes the step of obtaining, from an existing machine learning classifier 301, original probabilistic scores r(x) classifying samples taken from two or more groups (e.g. protected group A and non-protected group B) into two or more classes via supervised machine learning. For example, if there are two classes, e.g. 1="repay" and 0="default," a score of 0.90 means that the classifier predicts a 90% probability of repayment. If there are C>2 classes, then the classifier produces C probabilities that correspond to the classes and add up to 1. Classes thus include possibility of a percentage, not just a binary pay/don't pay prediction. Probabilistic scores can be converted to binary scores, if desired, using, e.g., a threshold such as greater than 50% (or other suitable value).

Further steps include associating the original probabilistic scores with a plurality of original Lagrange multipliers λ (e.g. with score transformer 303; see equation (9); and adjusting values of the plurality of original Lagrange multipliers via low-dimensional convex optimization to obtain updated Lagrange multipliers λ* that satisfy fairness constraints 307 as compared to the original Lagrange multipliers. Refer to Equation (12). Satisfaction of the fairness constraints can be subject to a tolerance, for example.

An even further step includes, based on the updated Lagrange multipliers, closed-form transforming the original probabilistic scores into transformed probabilistic scores 309 that satisfy the fairness constraints 307 while minimizing loss in utility; e.g., with score transformer 303. The fairness constraints are with respect to the two or more groups.

In some cases, as in FIG. 3 (post-processing mode), simply use the transformed probabilistic scores as classification output.

On the other hand, in some cases, such as the pre-processing mode of FIG. 4, generate modified training data from the transformed probabilistic scores (re-weighting step 311 re-weights existing training data 313 to obtained re-weighted data 315), and train a new classifier 319 on the modified training data using a standard, non-fairness-constrained algorithm 317. For example, trigger a signal to send the modified training data to a classifier and instruct the classifier to retrain itself (scores 309 to 311 to 317 yielding 319).

In at least some such cases, the samples include first samples, and a further step includes, with the new trained classifier 319, classifying second samples (which in general can be the same or different) into the two or more classes via supervised machine learning with the new classifier 319.

Furthermore, novel test data can be used in the post-processing case as well. Refer to FIG. 3 (post-processing). Once the transformer has been fixed, which is parameterized by the λ values, if there is a new data set, also with probabilistic scores, the same transformer can be used with the same Lagrange multipliers to transform the new scores. Thus, in some instances of post processing, the samples comprise first samples, and further steps include obtaining original probabilistic scores classifying second samples taken from the two or more groups into the two or more classes via supervised machine learning; and based on the updated Lagrange multipliers, closed-form transforming the original probabilistic scores classifying the second samples into transformed probabilistic scores that satisfy the fairness constraints while minimizing loss in utility, the fairness constraints being with respect to the two or more groups.

Switch 399 (which can be implemented in software, for example) can route transformed scores 309 to re-weighting step 311 for pre-processing or for direct use 397 as in the post-processing mode of FIG. 3.

In one or more embodiments, the steps are carried out without knowledge of protected attributes.

In the transforming step, the fairness constraints can include, for example, mean score parity, false positive parity, false negative parity, or the like.

In one or more embodiments, in the transforming step, minimizing the loss in utility includes minimizing cross-entropy between the transformed probabilistic scores and the original probabilistic scores. See Eq. (1).

In one or more instances, the low-dimensional convex optimization and the closed-form transforming reduce run time in a computer carrying out score transformation. For example, in FIGS. 6-8, compare results of embodiment(s) of the invention to the "red" (reduction) technique, which solves multiple sub-problems and is very computationally expensive. One or more embodiments, in contrast, only need to solve one sub-problem.

One or more embodiments further include controlling distribution of at least one of electrical power, water, and computing resources in accordance with the transformed probabilistic scores that satisfy the fairness constraints while minimizing the loss in utility. For example, in FIG. 9 (discussed below), send signals over network adapter 20 to control cloud resources shown in FIGS. 1 and 2, electrical switch bank 51, or fluid valve network 53.

Some embodiments further include obtaining related probabilities (that are related to the original probabilistic scores) (e.g., obtained at 305 or calculated within 303. For example, group distributions are computed in some manner—if the group distribution is required, it could be inferred by aggregating the protected attributes or estimates thereof provided with each data point. In some instances, the training data (not the test data) is assumed to have protected group labels and the fraction in group A vs. B is simply computed. This can be achieved, for example, with suitable Python code. In some cases, either protected attribute information (what group each individual belongs to), or some estimate thereof, will be required. An example of an estimate is that a particular person is in Group A with probability 0.6. Information of either form permits inferring group distributions. Other examples of related probabilities depend on which fairness criterion is being used—for example, group distributions needed for statistical/score parity. For equalized odds, joint distribution of groups and classes will also be appropriate (but this can also be inferred).

In another aspect, an exemplary system includes a memory (e.g. 30, discussed elsewhere); a non-transitory computer readable medium (e.g. 34, discussed elsewhere) including computer executable instructions; and at least one processor 16, coupled to the memory and the non-transitory computer readable medium, and operative to execute the instructions to be operative to perform any one, some, or all of the method steps described above. The instructions on the medium can also configure the processor to instantiate appropriate software components; for example, the algorithm 317, classifiers 301, 319, transformer 303, and so on.

Figure 9:
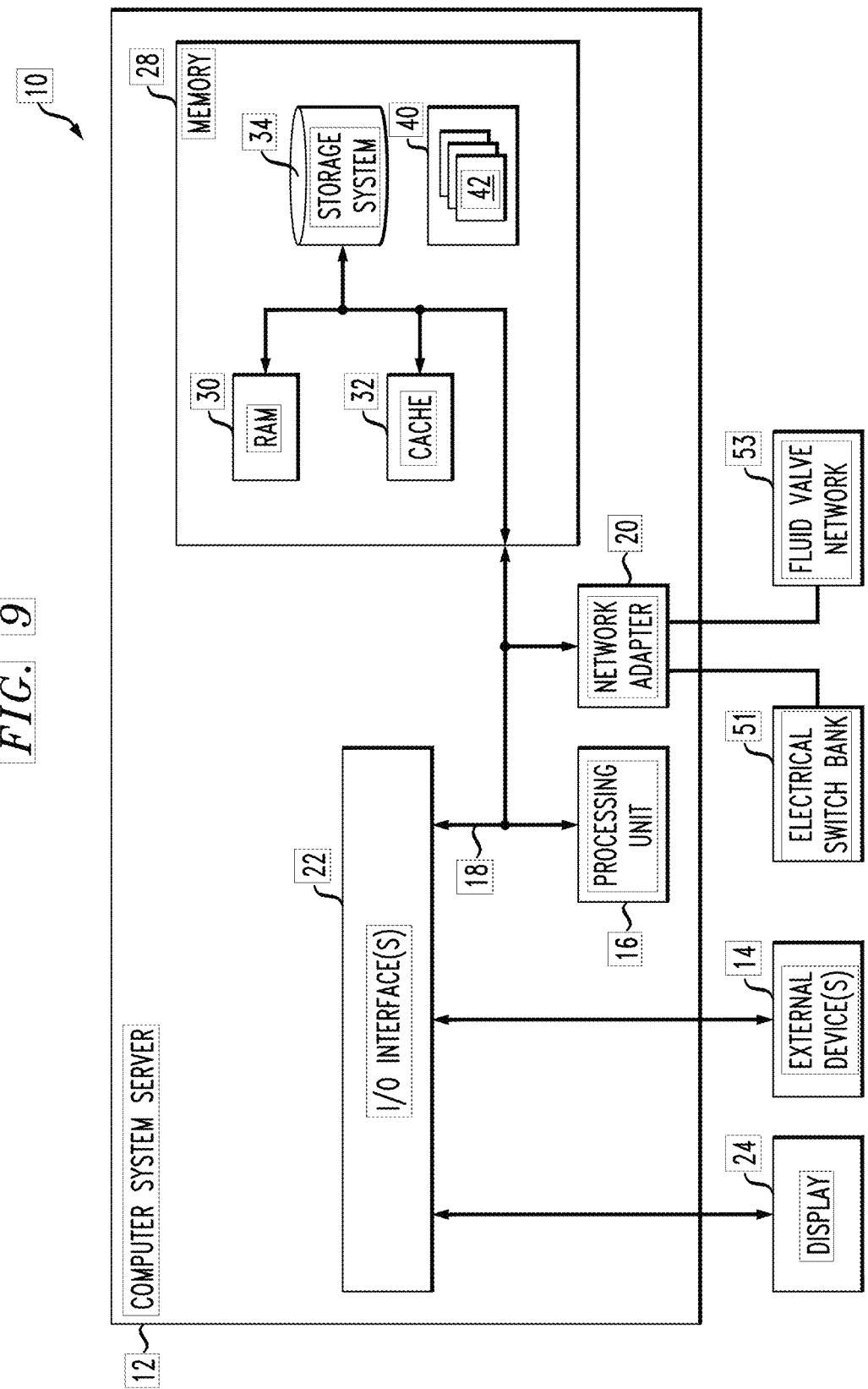
FIG. 9 depicts a computer system that may be useful in implementing one or more aspects and/or elements of the invention, also representative of a cloud computing node according to an embodiment of the present invention.

One or more embodiments of the invention, or elements thereof, can accordingly be implemented in the form of an apparatus/system including a memory and at least one processor that is coupled to the memory and operative to perform exemplary method steps. FIG. 9 depicts a computer system that may be useful in implementing one or more aspects and/or elements of the invention, also representative of a cloud computing node according to an embodiment of the present invention. Referring now to FIG. 9, cloud computing node 10 is only one example of a suitable cloud computing node and is not intended to suggest any limitation as to the scope of use or functionality of embodiments of the invention described herein. Regardless, cloud computing node 10 is capable of being implemented and/or performing any of the functionality set forth hereinabove.

In cloud computing node 10 there is a computer system/server 12, which is operational with numerous other general purpose or special purpose computing system environments or configurations. Examples of well-known computing systems, environments, and/or configurations that may be suitable for use with computer system/server 12 include, but are not limited to, personal computer systems, server computer systems, thin clients, thick clients, handheld or laptop devices, multiprocessor systems, microprocessor-based systems, set top boxes, programmable consumer electronics, network PCs, minicomputer systems, mainframe computer systems, and distributed cloud computing environments that include any of the above systems or devices, and the like.

Computer system/server 12 may be described in the general context of computer system executable instructions, such as program modules, being executed by a computer system. Generally, program modules may include routines, programs, objects, components, logic, data structures, and so on that perform particular tasks or implement particular abstract data types. Computer system/server 12 may be practiced in distributed cloud computing environments where tasks are performed by remote processing devices that are linked through a communications network. In a distributed cloud computing environment, program modules may be located in both local and remote computer system storage media including memory storage devices.

As shown in FIG. 9, computer system/server 12 in cloud computing node 10 is shown in the form of a general-purpose computing device. The components of computer system/server 12 may include, but are not limited to, one or more processors or processing units 16, a system memory 28, and a bus 18 that couples various system components including system memory 28 to processor 16.

Bus 18 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus.

Computer system/server 12 typically includes a variety of computer system readable media. Such media may be any available media that is accessible by computer system/server 12, and it includes both volatile and non-volatile media, removable and non-removable media.

System memory 28 can include computer system readable media in the form of volatile memory, such as random access memory (RAM) 30 and/or cache memory 32. Computer system/server 12 may further include other removable/non-removable, volatile/non-volatile computer system storage media. By way of example only, storage system 34 can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 18 by one or more data media interfaces. As will be further depicted and described below, memory 28 may include at least one program product having a set (e.g., at least one) of program modules that are configured to carry out the functions of embodiments of the invention.

Program/utility 40, having a set (at least one) of program modules 42, may be stored in memory 28 by way of example, and not limitation, as well as an operating system, one or more application programs, other program modules, and program data. Each of the operating system, one or more application programs, other program modules, and program data or some combination thereof, may include an implementation of a networking environment. Program modules 42 generally carry out the functions and/or methodologies of embodiments of the invention as described herein.

Computer system/server 12 may also communicate with one or more external devices 14 such as a keyboard, a pointing device, a display 24, etc.; one or more devices that enable a user to interact with computer system/server 12; and/or any devices (e.g., network card, modem, etc.) that enable computer system/server 12 to communicate with one or more other computing devices. Such communication can occur via Input/Output (I/O) interfaces 22. Still yet, computer system/server 12 can communicate with one or more networks such as a local area network (LAN), a general wide area network (WAN), and/or a public network (e.g., the Internet) via network adapter 20. As depicted, network adapter 20 communicates with the other components of computer system/server 12 via bus 18. It should be understood that although not shown, other hardware and/or software components could be used in conjunction with computer system/server 12. Examples, include, but are not limited to: microcode, device drivers, redundant processing units, and external disk drive arrays, RAID systems, tape drives, and data archival storage systems, etc.

Thus, one or more embodiments can make use of software running on a general purpose computer or workstation. With reference to FIG. 9, such an implementation might employ, for example, a processor 16, a memory 28, and an input/output interface 22 to a display 24 and external device(s) 14 such as a keyboard, a pointing device, or the like. The term "processor" as used herein is intended to include any processing device, such as, for example, one that includes a CPU (central processing unit) and/or other forms of processing circuitry. Further, the term "processor" may refer to more than one individual processor. The term "memory" is intended to include memory associated with a processor or CPU, such as, for example, RAM (random access memory) 30, ROM (read only memory), a fixed memory device (for example, hard drive 34), a removable memory device (for example, diskette), a flash memory and the like. In addition, the phrase "input/output interface" as used herein, is intended to contemplate an interface to, for example, one or more mechanisms for inputting data to the processing unit (for example, mouse), and one or more mechanisms for providing results associated with the processing unit (for example, printer). The processor 16, memory 28, and input/output interface 22 can be interconnected, for example, via bus 18 as part of a data processing unit 12. Suitable interconnections, for example via bus 18, can also be provided to a network interface 20, such as a network card, which can be provided to interface with a computer network, and to a media interface, such as a diskette or CD-ROM drive, which can be provided to interface with suitable media.

Accordingly, computer software including instructions or code for performing the methodologies of the invention, as described herein, may be stored in one or more of the associated memory devices (for example, ROM, fixed or removable memory) and, when ready to be utilized, loaded in part or in whole (for example, into RAM) and implemented by a CPU. Such software could include, but is not limited to, firmware, resident software, microcode, and the like.

A data processing system suitable for storing and/or executing program code will include at least one processor 16 coupled directly or indirectly to memory elements 28 through a system bus 18. The memory elements can include local memory employed during actual implementation of the program code, bulk storage, and cache memories 32 which provide temporary storage of at least some program code in order to reduce the number of times code must be retrieved from bulk storage during implementation.

Input/output or I/O devices (including but not limited to keyboards, displays, pointing devices, and the like) can be coupled to the system either directly or through intervening I/O controllers.

Network adapters 20 may also be coupled to the system to enable the data processing system to become coupled to other data processing systems or remote printers or storage devices through intervening private or public networks. Modems, cable modem and Ethernet cards are just a few of the currently available types of network adapters.

As used herein, including the claims, a "server" includes a physical data processing system (for example, system 12 as shown in FIG. 9) running a server program. It will be understood that such a physical server may or may not include a display and keyboard.

One or more embodiments can be at least partially implemented in the context of a cloud or virtual machine environment, although this is exemplary and non-limiting. Reference is made back to FIGS. 1-2 and accompanying text. Consider, e.g., a cloud-based service 96 (or one or more elements thereof) to provide optimized score transformation for fair classification, located in layer 90.

It should be noted that any of the methods described herein can include an additional step of providing a system comprising distinct software modules embodied on a computer readable storage medium; the modules can include, for example, any or all of the appropriate elements depicted in the block diagrams and/or described herein; by way of example and not limitation, any one, some or all of the modules/blocks and or sub-modules/sub-blocks described. The method steps can then be carried out using the distinct software modules and/or sub-modules of the system, as described above, executing on one or more hardware processors such as 16. Further, a computer program product can include a computer-readable storage medium with code adapted to be implemented to carry out one or more method steps described herein, including the provision of the system with the distinct software modules.

One example of user interface that could be employed in some cases is hypertext markup language (HTML) code served out by a server or the like, to a browser of a computing device of a user. The HTML is parsed by the browser on the user's computing device to create a graphical user interface (GUI).

Exemplary System and Article of Manufacture Details

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A method comprising:
    obtaining, from an existing machine learning classifier, original probabilistic scores classifying samples taken from two or more groups into two or more classes via supervised machine learning;
    associating said original probabilistic scores with a plurality of original Lagrange multipliers;
    adjusting values of said plurality of original Lagrange multipliers via low-dimensional convex optimization to obtain updated Lagrange multipliers that satisfy fairness constraints as compared to said original Lagrange multipliers;
    based on said updated Lagrange multipliers, closed-form transforming said original probabilistic scores into transformed Lagrange multiplier-based scores that satisfy said fairness constraints while minimizing loss in utility, said fairness constraints being with respect to said two or more groups;
    generating modified training data from said transformed Lagrange multiplier-based scores; and
    training a new classifier on said modified training data using a standard, non-fairness-constrained algorithm;
    wherein said samples comprise first samples, further comprising, with said new trained classifier, classifying second samples into said two or more classes via supervised machine learning with said new classifier.

2. The method of claim 1, further comprising using said transformed Lagrange multiplier-based scores as classification output.

3. The method of claim 1, further comprising:
    obtaining original probabilistic scores classifying said second samples taken from said two or more groups into said two or more classes via said supervised machine learning; and
    based on said updated Lagrange multipliers, closed-form transforming said original probabilistic scores classifying said second samples into transformed Lagrange multiplier-based scores that satisfy said fairness constraints while minimizing loss in utility, said fairness constraints being with respect to said two or more groups.

4. The method of claim 1, wherein said method is carried out without knowledge of protected attributes.

5. The method of claim 1, wherein, in said closed-form transforming step, said fairness constraints comprise mean score parity.

6. The method of claim 1, wherein, in said closed-form transforming step, said fairness constraints comprise false positive parity.

7. The method of claim 1, wherein, in said closed-form transforming step, said fairness constraints comprise false negative parity.

8. The method of claim 1, wherein, in said closed-form transforming step, minimizing said loss in utility comprises minimizing cross-entropy between said transformed Lagrange multiplier-based scores and said original probabilistic scores.

9. The method of claim 1, wherein said low-dimensional convex optimization and said closed-form transforming reduce run time in a computer carrying out score transformation.

10. The method of claim 1, further comprising controlling distribution of at least one of electrical power, water, and computing resources in accordance with said transformed Lagrange multiplier-based scores that satisfy said fairness constraints while minimizing said loss in utility.

11. A system comprising:
    a memory;
    a non-transitory computer readable medium comprising computer executable instructions; and
    at least one processor, coupled to said memory and said non-transitory computer readable medium, and operative to execute said instructions to be operative to:
        obtain, from an existing machine learning classifier, original probabilistic scores classifying samples taken from two or more groups into two or more classes via supervised machine learning;
        associate said original probabilistic scores with a plurality of original Lagrange multipliers;
        adjust values of said plurality of original Lagrange multipliers via low-dimensional convex optimization to obtain updated Lagrange multipliers that satisfy fairness constraints as compared to said original Lagrange multipliers;
        based on said updated Lagrange multipliers, closed-form transform said original probabilistic scores into transformed Lagrange multiplier-based scores that satisfy said fairness constraints while minimizing loss in utility, said fairness constraints being with respect to said two or more groups;
        generate modified training data from said transformed Lagrange multiplier-based scores; and
        train a new classifier on said modified training data using a standard, non-fairness-constrained algorithm.

12. The system of claim 11, wherein said at least one processor is further operative to execute said instructions to use said transformed Lagrange multiplier-based scores as classification output.

13. The system of claim 11, wherein said at least one processor is further operative to:
    obtain original probabilistic scores classifying said second samples taken from said two or more groups into said two or more classes via said supervised machine learning; and
    based on said updated Lagrange multipliers, closed-form transform said original probabilistic scores classifying said second samples into transformed Lagrange multiplier-based scores that satisfy said fairness constraints while minimizing loss in utility, said fairness constraints being with respect to said two or more groups.

14. The system of claim 11, wherein said at least one processor is operative to carry out said instructions without knowledge of protected attributes.

15. The system of claim 11, wherein minimizing said loss in utility comprises minimizing cross-entropy between said transformed Lagrange multiplier-based scores and said original probabilistic scores.

16. The system of claim 11, wherein said at least one processor is further operative to control distribution of at least one of electrical power, water, and computing resources in accordance with said transformed Lagrange multiplier-based scores that satisfy said fairness constraints while minimizing said loss in utility.

17. A non-transitory computer readable medium comprising computer executable instructions which when executed by a computer cause the computer to perform the method of:

obtaining, from an existing machine learning classifier, original probabilistic scores classifying samples taken from two or more groups into two or more classes via supervised machine learning;

associating said original probabilistic scores with a plurality of original Lagrange multipliers;

adjusting values of said plurality of original Lagrange multipliers via low-dimensional convex optimization to obtain updated Lagrange multipliers that satisfy fairness constraints as compared to said original Lagrange multipliers;

based on said updated Lagrange multipliers, closed-form transforming said original probabilistic scores into transformed Lagrange multiplier-based scores that satisfy said fairness constraints while minimizing loss in utility, said fairness constraints being with respect to said two or more groups;

generating modified training data from said transformed Lagrange multiplier-based scores; and training a new classifier on said modified training data using a standard, non-fairness-constrained algorithm.

18. The non-transitory computer readable medium of claim 17, wherein the computer-readable instructions further cause the computer to perform the additional method step of controlling distribution of at least one of electrical power, water, and computing resources in accordance with said transformed Lagrange multiplier-based scores that satisfy said fairness constraints while minimizing said loss in utility.

* * * * *